United States Patent
Venkata et al.

(10) Patent No.: US 11,985,645 B2
(45) Date of Patent: May 14, 2024

(54) DYNAMIC UPLINK Tx DC SUB-CARRIER LOCATION REPORTING

(71) Applicant: APPLE INC., Cupertino, CA (US)

(72) Inventors: Naveen Kumar R Palle Venkata, San Diego, CA (US); Anatoliy S. Ioffe, Cupertino, CA (US); Fangli Xu, Beijing (CN); Fucheng Wang, Cupertino, CA (US); Haijing Hu, Cupertino, CA (US); Ralf Rossbach, Bavaria-Bayern (DE); Sarma V. Vangala, Cupertino, CA (US); Yuqin Chen, Beijing (CN); Zhibin Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 486 days.

(21) Appl. No.: 17/593,513

(22) PCT Filed: Oct. 22, 2020

(86) PCT No.: PCT/CN2020/122870
§ 371 (c)(1),
(2) Date: Sep. 20, 2021

(87) PCT Pub. No.: WO2022/082615
PCT Pub. Date: Apr. 28, 2022

(65) Prior Publication Data
US 2022/0312416 A1    Sep. 29, 2022

(51) Int. Cl.
*H04W 72/0453* (2023.01)
*H04W 72/51* (2023.01)

(52) U.S. Cl.
CPC ....... *H04W 72/0453* (2013.01); *H04W 72/51* (2023.01)

(58) Field of Classification Search
CPC .............. H04W 72/51; H04W 72/251; H04W 72/0453; H04W 72/0457; H04L 5/0098
See application file for complete search history.

(56) References Cited

U.S. PATENT DOCUMENTS

2018/0035416 A1* 2/2018 Yi .................... H04L 5/0037
2019/0313394 A1 10/2019 Kubota et al.
(Continued)

FOREIGN PATENT DOCUMENTS

| CN | 110785939 A | 2/2020 |
| WO | 2020160566 A1 | 8/2020 |
| WO | 2020202545 A1 | 10/2020 |

OTHER PUBLICATIONS

Anritsu, "On txDirectCurrentLocation", R5-202924, 3GPP TSG-RAN5 Meeting 87-e, Electric Meeting, Agenda Item 5.3.2.17, May 18-29, 2020, 2 pages.
(Continued)

*Primary Examiner* — Bo Hui A Zhu
(74) *Attorney, Agent, or Firm* — Dorsey & Whitney LLP

(57) ABSTRACT

Reporting UL Tx DC sub-carrier location information may include decoding a radio resource control (RRC) message received from a base station. The RRC message may comprise a configuration for dynamically reporting uplink (UL) transmit (Tx) direct current (DC) sub-carrier location information. A change associated with at boast one previous UL Tx DC sub-carrier location may be determined to have occurred, thereby creating at least one new UL Tx DC sub-carrier location. In response to determining the change, a medium access control (MAC) control element (MAC CE) may be encoded for transmission to the base station. The MAC CE may include information corresponding to the at least one new UL Tx DC sub-carrier location.

20 Claims, 16 Drawing Sheets

(56) References Cited

U.S. PATENT DOCUMENTS

2020/0212984 A1\* 7/2020 Fellhauer ............. H04B 7/0617
2022/0070891 A1\* 3/2022 Nam .................... H04W 72/21

OTHER PUBLICATIONS

PCT/CN2020/122870, International Search Report and Written Opinion, Jul. 21, 2021, 10 pages.

\* cited by examiner

| Bit 7 | Bit 6 | Bit 5 | Bit 4 | Bit 3 | Bit 2 | Bit 1 | Bit 0 |
|---|---|---|---|---|---|---|---|
| C7 | C6 | C5 | C4 | C3 | C2 | C1 | C0 |
| C15 | C14 | C13 | C12 | C11 | C10 | C9 | C8 |
| C23 | C22 | C21 | C20 | C19 | C18 | C17 | C16 |
| C31 | C30 | C29 | C28 | C27 | C26 | C25 | C24 |
| BWP ID | | UL or SUL | 7.5 kHz shift | DC sub-carrier location. (12 bits) | | | |
| DC sub-carrier location. (12 bits) | | | | | | | |
| BWP ID | | UL or SUL | 7.5 kHz shift | DC sub-carrier location. (12 bits) | | | |
| DC sub-carrier location. (12 bits) | | | | | | | |
| BWP ID | | UL or SUL | 7.5 kHz shift | DC sub-carrier location. (12 bits) | | | |
| DC sub-carrier location. (12 bits) | | | | | | | |
| BWP ID | | UL or SUL | 7.5 kHz shift | DC sub-carrier location. (12 bits) | | | |
| DC sub-carrier location. (12 bits) | | | | | | | |
| Information provided for the rest of the serving cells that are set in octets 2-5 | | | | | | | |

DYNAMIC UPLINK Tx DC SUB-CARRIER LOCATION REPORTING

TECHNICAL FIELD

This application relates generally to wireless communication systems, including transmit (Tx) direct current (DC) sub-carrier location reporting.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include glob-al system flu mobile communications (GSM) enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 illustrates an example embodiment of information that may be included in a Tx DC sub-carrier location reporting MAC CE.

DETAILED DESCRIPTION

Release-15 of 3GPP NR provides that a UE can report to the network (NW) a current transmit (Tx) direct current (DC) sub-carrier location when the is transmitting in an uplink (UL) channel. Such location information can help the NW to handle the zero DC physical resource blocks (PRBs) for effective demodulation and decoding. In particular, the DC sub-carrier location may comprise the center of a relevant frequency band and may allow the NW to know the location in the frequency spectrum at which the UE is allowed to transmit. The UE may report the current Tx DC sub-carrier location for a cell group with each of the carriers for which the UE is configured in that cell-group. In addition, with respect to each of the carriers, the UE reports for each of the configured bandwidth parts (BWPs).

The following comprises an information element (IE) associated with the principles described herein:

```
RRCReconfigurationComplete ::= SEQUENCE {
    rrc-TransactionIdentifier RRC-TransactionIdentifier,
    criticalExtensions CHOICE {
        rrcReconfigurationComplete RRCReconfiguratianComplete-IEs,
        criticalExtensionsFuture  SEQUENCE { }
    }
}
RRCReconfigurationComplete-IEs ::= SEQUENCE {
    * lateNonCriticalExtension OCTET STRING OPTIONAL,
    * nonCriticalExtension   RRCReconfigurationComplete-v1530-IEs OPTIONAL
}
RRCReconfigurationComplete-v1530-IEs ::= SEQUENCE {
    * uplinkTxDirectCurrentList UplinkTxDirectCurrentList OPTIONAL,
    * nonCriticalExtension  RRCReconfigurationComplete-v1560-IEs OPTIONAL
    UplinkTxDirectCurrentList ::= SEQUENCE (SIZE(1..maxNrofServingCells)) OF
UplinkTxDirectCurrentCell
    UplinkTxDirectCurrentCell ::= SEQUENCE {
    servCellIndex      ServCellIndex,
    uplinkDirectCurrentBWP   SEQUENCE (SIZE(1..maxNrofBWPs)) OF
UplinkTxDirectCurrentBWP,
    ...,
    [[
    * uplinkDirectCurrentBWP-SUL SEQUENCE (SIZE(1..maxNrofBWPs)) OF
UplinkTxDirectCurrentBWP OPTIONAL,
    ]]
}
UplinkTxDirectCurrentBWP ::= SEQUENCE {
bwp-Id       BWP-Id,
shift7dot5kHz    BOOLEAN,
txDirectCurrentLocation INTEGER (0..3301)
```

Figure 1:
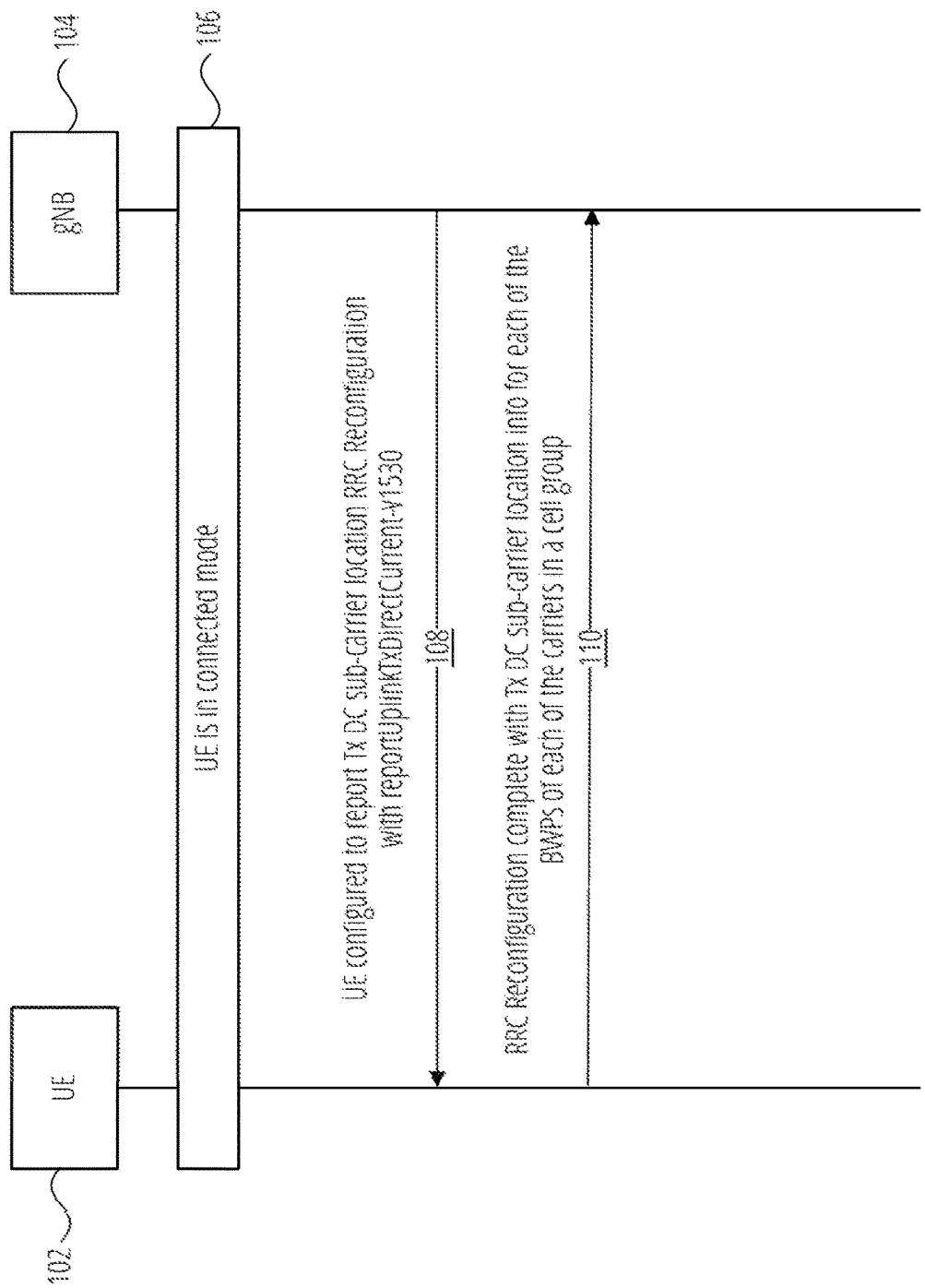
FIG. 1 illustrates a communication flowchart associated with the current signaling of Tx DC sub-carrier location reporting.

FIG. 1 illustrates a communication flowchart associated with the current signaling or Tx DC sub-carrier location reporting. As illustrated, a UE 102 may be in connected mode (shown by block 106) relative to a base station 104 (e.g., a gNB). As illustrated by arrow 108, the base station 104 may configure the UE 102 to report Tx DC sub-carrier location via radio resource control (RRC) configuration. Finally as illustrated by arrow 110, the UE 102 reports Tx DC sub-carrier location via radio RR configuration.

Notably, the current signaling associated with Tx DC sub-carrier location reporting has various shortcomings. In particular, the UE reports Tx DC sub-carrier location information on as a response to the RRC configuration with DC location request by the base station, which causes a number of additional problems. First, the UE may not report the Tx DC sub-carrier location by itself (i.e., only when triggered by the NW).

Second, depending on a given configuration of the UE, the Tx DC sub-carrier location may change when there is an addition/removal of a carrier, in response to activation/deactivation of a carrier, or in response to a BWP switch in any active carrier. Furthermore, in the case of intra-band contiguous or non-contiguous carrier aggregation (CA) where multiple carriers are being handled by the UE using Tx chain hardware (HW) sharing, the switch in BWP in any of the carders can result in the UL Tx DC sub-carrier location changing at the UE.

Third, the UE may not inform the NW regarding a change in such information unless the NW explicitly makes a request via RRC messaging. Accordingly, the NW may not always be aware of Tx DC sub-carrier location changes, which can result in decreased UL Tx decoding performance at the NW, causing inefficient use of resources. In addition, BWP switching can be done by the NW without RRC signaling (i.e., DCI based), which can also result in a change in Tx DC sub-carrier location change.

Figure 2A:
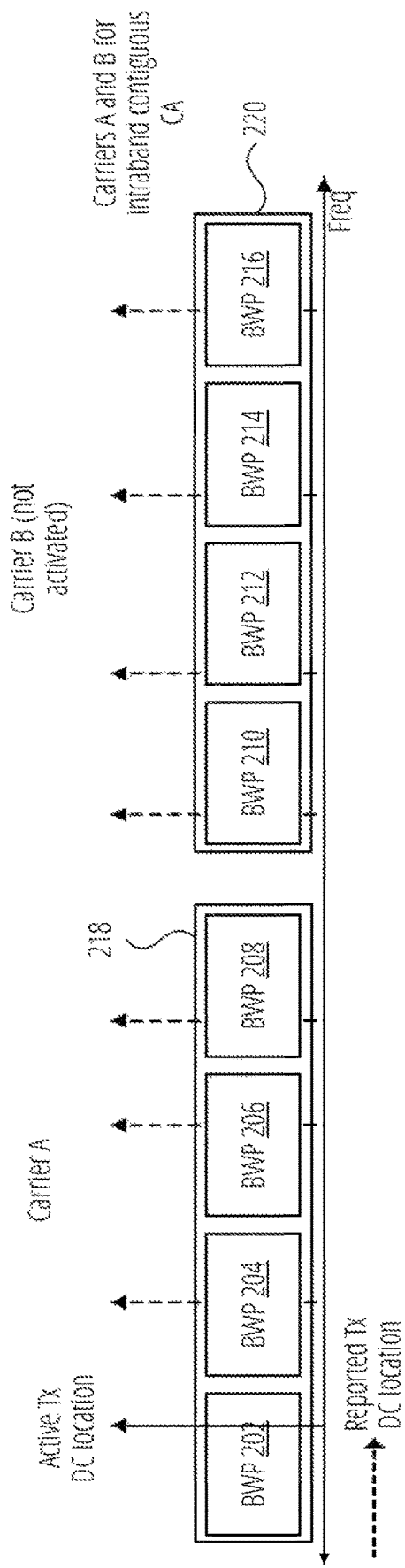
FIG. 2A illustrates an example of current Tx DC sub-carrier location reporting shortcomings.
Figure 2B:
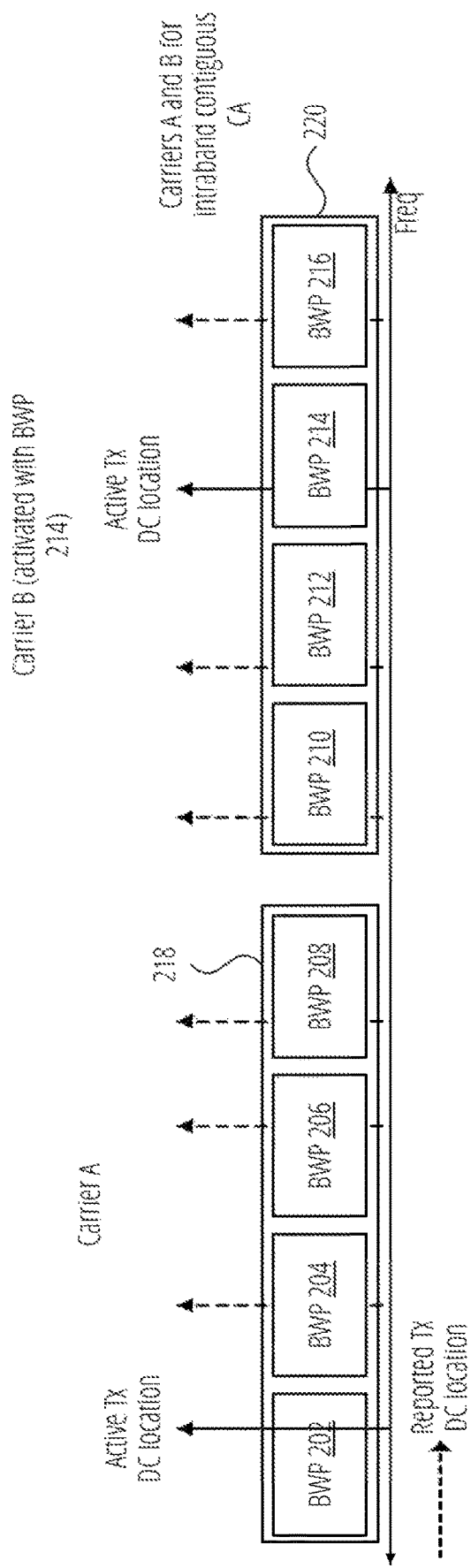
FIG. 2B illustrates an example of current Tx DC sub-carrier location reporting shortcomings.
Figure 2C:
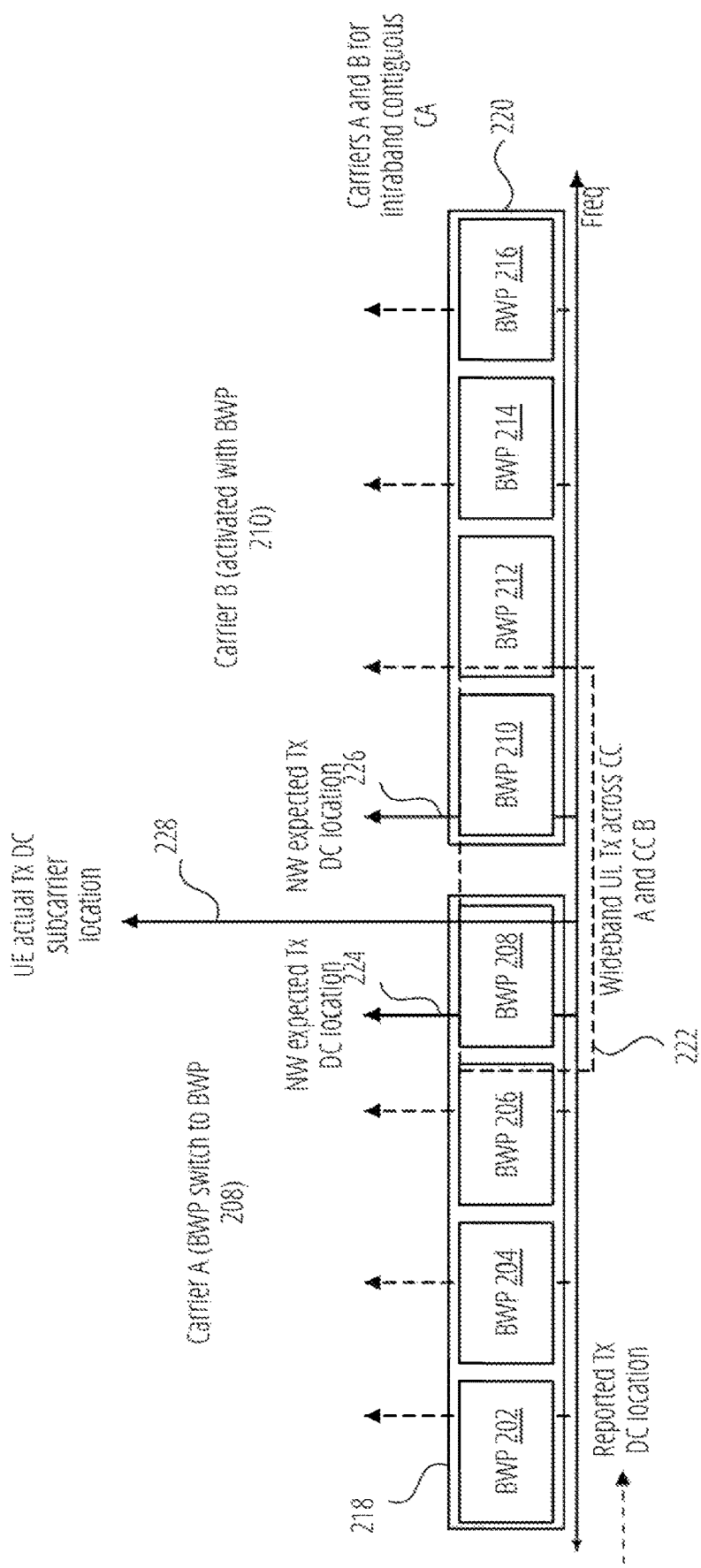
FIG. 2C illustrates an example of current Tx DC sub-carrier location reporting shortcomings.

FIGS. 2A-2C illustrate an example of current Tx DC sub-carrier location reporting shortcomings. As shown, each of FIGS. 2A-2C include a Bit 2 218 having four BWPs (i.e., BWP 202 through BWP 208) and a Carrier B 220 having four BWPs (i.e., BWP 210 through BWP 216).

As illustrated in FIG. 2A Bit 2 218 and Carrier B 220 comprise art intraband contiguous carrier aggregation (CA) with only Bit 2 218 being activated (i.e., Carrier B 220 is currently not activated). In addition, both the active Tx DC location and the reported Tx DC location are the same (i.e., within B 202).

As illustrated in FIG. 2B, at some point the Carrier B 220 may also be activated. In such a case, an active Tx DC location may be associated with a particular BWP of the Carrier B 220. As shown, the active Tx DC location associated with Carrier B 220 is within the BWP 214. However, the NW may not be notified of such despite having the current Tx DC location associated with the Bit 2 218 (i.e., within the BWP 202). Notably, the NW may both activate Carrier B 220 in relation to a given UE and still not know the active Tx DC location associated with that carrier because activation may be performed by a different layer of the NW than the layer associated with receiving Tx DC location reporting. For instance, carrier activation may occur via downlink control information (DCI) while Tx DC location reporting is per via RRC. While some NWs may be configured to share information between various layers, others may not.

As illustrated in FIG. 2C, a UE may share UL Tx HW resources (e.g., for using a Wideband UL for both Carriers A and B with a single PLL for Tx) which can result in the Tx DC carrier being shifted. In particular, FIG. 2C illustrates a wideband UL Tx 222 across the Bit 2 218 and the Carrier B 220. In such cases, the NW may incorrectly assume different UL Tx DC sub-carrier locations for one or more carriers. More specifically, as shown in FIG. 2C, the NW may expect the Tx DC location to be a lower frequency within BWP 208 (as represented by arrow 224) and/or a lower frequency within BWP 210 (as represented by arrow 226) When the actual Tx DC subcarrier location may be in a higher frequency within BWP 208 (as represented by arrow 228).

Accordingly, RRC-based signaling may not be effective in conveying UL Tx DC sub-carrier location information to the NW based on the combination of at least one or more of the following: 1. The location of the UL Tx DC may change based on the active configuration of the BWPs of the activated carriers; 2. The location of the UL Tx DC may change based on the activation and deactivation of carriers; and 3. The active BWP information is not always available via RRC.

One possible option to improve on the current signaling may be to report the Tx DC sub-carrier location information for all possible DC locations based on the different BWP configurations of active BWPs. However, when there are 2 carriers with 4 BWPs locations, there are at least 16 combinations where the UE can report CL Tx DC sub-carrier locations to the NW. Accordingly, the signaling overhead may be prohibitive as the combinations explode as the number of carriers increase (e.g., with 3 carriers there may be at least 64 combinations minimum).

Instead, three other detailed solutions are provided herein in the first detailed solution, the UE may trigger UL Tx DC sub-carrier location reporting with a medium access control (MAC) control element (MAC CE). In particular, via RRC messaging, the NW may configure the UE to dynamically report Tx DC sub-carrier location info. In this way, the UE may be aware that the NW supports decoding the MAC CE.

Tx DC sub carrier location reporting may allow for reporting by the UE each time there is a change in the UL Tx DC sub-carrier location in any active carrier. For instance, such changes may be in response to the switching of BWP via RRC (or via DCI), due to a transition to the initial downlink (DL) BWP in time division duplex (TDD), and so forth. Notably, NR MAC for that cell group may trigger a MAC CE. The trigger of the MAC CE can also re-use the logic of other MAC CE triggers like buffer status report (BSR). Similarly, the MAC can re-use actions related to the triggering of a MAC CE. In addition the priority of the DC location MAC CE can be lower than a secondary cell (SCell) BFR MAC CE. As a sub-option associated with the first detailed solution, the transmission of the MAC CE can be delayed with a timer.

The MAC CE May contain at least the Tx DC sub-carrier location for each of the carriers in the current BWP configuration. It should be noted that the MAC CE includes the DC location assuming the current active BWPs in all the carriers for which the UE is operating in. When there is a BWP switch or a carrier is activated/deactivated, another MAC CE may be triggered if it results in a change in Tx DC sub-carrier location for any of the active carriers based on the UE's internal implementation. As an option, more information relevant to this can also be sent as an option (e.g., 7.5 kHz shift) for each of the BWPs with active carriers.

In another option, the MAC CE may be limited to simply the Tx DC sub-carrier location for the current active BWP of the active carrier or the Tx DC sub-carrier locations for all of the configured is of the active carrier. When the Tx DC sub-carrier locations for all the configured BWPs of the active carriers is sent, while the MAC CE may be large, the UE may not have to trigger another MAC CE for the BWP switch in a carrier if the Tx DC sub-carrier location may not change. An advantage of limiting repotting to the Tx DC sub-carrier location for the active BWP is keeping the MAC CE content concise and relevant for the current situation. However, doing so may also risk triggering MAC CEs more often.

In another option, the may trigger Tx DC sub-carrier location reporting with MAC CE for both a master cell group (MCG) and a secondary cell group (SCG). The MAC CE may also include the Tx DC sub-carrier location for each carrier from another cell-group, if configured (I.e., when there is a change in the Tx DC sub-carrier location of any carriers in the other cell group). This option is also applicable to LTE-NR dual connectivity. For instance, when the UE is in a DC, with LTE and NR where the LTE and the NR form a contiguous band (i.e., intra-band contiguous DC combinations).

In addition, the UE may trigger the MAC CE an the MCG and the primary cell (PCell) in the MCG can transfer such information to the SCG. Such solution may be particularly practical in the intra-band EN_DC cases where the PCell and the primary SGC cell (PSCell) are usually co-located.

In contrast, the UE may be limited to triggering the MAC CE in the NR cell-group (i.e., wherever the NR is located in MCG or SCG). Notably, such option does not require MCG-SCG coordination.

The Tx DC sub-carrier location information MAC CE can also provide location information fair the supplementary UL (SUL) BWPs of the same serving cell. The UE may provide the Tx DC sub-carrier location for the both the normal UL and the SUL BWPs of the active BWP in the active carrier. In addition, the MAC CE may be triggered if either of a normal UL (NUL) or the SUL Tx DC sub-carrier location info changes.

Furthermore, the MAC CE signaling can be self-complete signaling or delta-based signaling. In self-complete signaling, the UE may report the UL Tx DC sub-carrier location information with the MAC CE, which MAC CE may contain location information of all the serving cells. As such, the NW may have all relevant location information related to serving cells from this single MAC CE.

In delta-based signaling, the UE may simply provide the location information for, the serving cell (and the corresponding BWPs) where the information has changed as compared to the previous MAC CE transmission. If the info for a particular serving cell is absent, the NW may expect that the Tx DC sub-carrier location info has not chanced from the previous information transmitted by the UE.

Self-contained signaling may be beneficial because the UE does not have to remember previously provided info and the NW does not have to save the configuration or transfer the configuration to other network nodes. In contrast, delta-based signaling has advantages based on the compact nature of the associated MAC CE signaling.

Figure 4:
FIG. 4 illustrates an example embodiment of information that may be included in a Tx DC sub-carrier location reporting MAC CE.

FIG. 3 illustrates an example embodiment 300 of the information that may be included in the MAC CE discussed herein when a BWP ID is included. In contrast, FIG. 4 illustrates an example embodiment 400 of the information that may be included in the MAC CE discussed herein when a BWP ID is not included.

The second detailed solution is related to dynamic signaling with MAC and semi-static signaling with RRC. The second detailed solution may reduce the content of the MAC CE by having the UE provide the Tx DC sub-carrier location information for multiple combinations upfront as part of the RRC reconfiguration complete message. The MAC CE may then refer to one of the provided combinations as part of a dynamic update of the Tx DC sub-carrier location.

As part of any RRC reconfiguration message where the carrier configuration or the BWP configuration changes, the UE may provide to the NW the combination of Tx DC sub-carrier locations that are possible with different combinations of BWPs/carriers configured. The Tx DC sub-carrier locations can be value of entries where each entry has the DC location in for each BWP/SUL BWP of each carrier. The MAC CE then refers to the entry ID, where the size of MAC CE is considerably reduced. Accordingly, the size of the dynamic update is concise.

As part of RRC reconfiguration complete message, the UE may provide an information element (IE), UplinkTxDirectConfiguration that includes the following: a list of Tx DC sub-carrier locations for each of the configured BWPs for each of the configured serving cells. Each portion of this list is a representation of the IE, UplinkTxDirectCurrentList (from slide 3). The UE can try to provide a comprehensive list of such combinations and in the MAC CE, simply refer to a combination thin is being used at the UE. For design purposes, if it is assumed that the list of UplinkTxDirectCurrentList is 512 entries, the MAC CE may refers to the index froth one of these eludes. For instance, the last line of the following IE may be added to the IF included above.

```
UplinkTxDirectCurrentList ::= SEQUENCE
(SIZE(1..maxNrofServingCells)) OF UplinkTxDirectCurrentCell
    UplinkTxDirectCurrentCell ::= SEQUENCE {
    servCellIndex        ServCellIndex,
    uplinkDirectCurrentBWP  SEQUENCE
(SIZE(1..maxNrofBWPs)) OF UplinkDirectCurrentBWP,
    ...,
    [[
        * uplinkDirectCurrentBWP-SUL SEQUENCE
(SIZE(1..maxNrofBWPs)) OF UplinkTxDirectCurrentBWP
        OPTIONAL,
    ]]
    }
    UplinkTxDirectCurrentBWP ::= SEQUENCE {
    bwp-Id        BWP-Id,
    shift7dot5kHz    BOOLEAN,
    txDirectCurrentLocation INTEGER (0..3301)
    }
```

Figure 5:
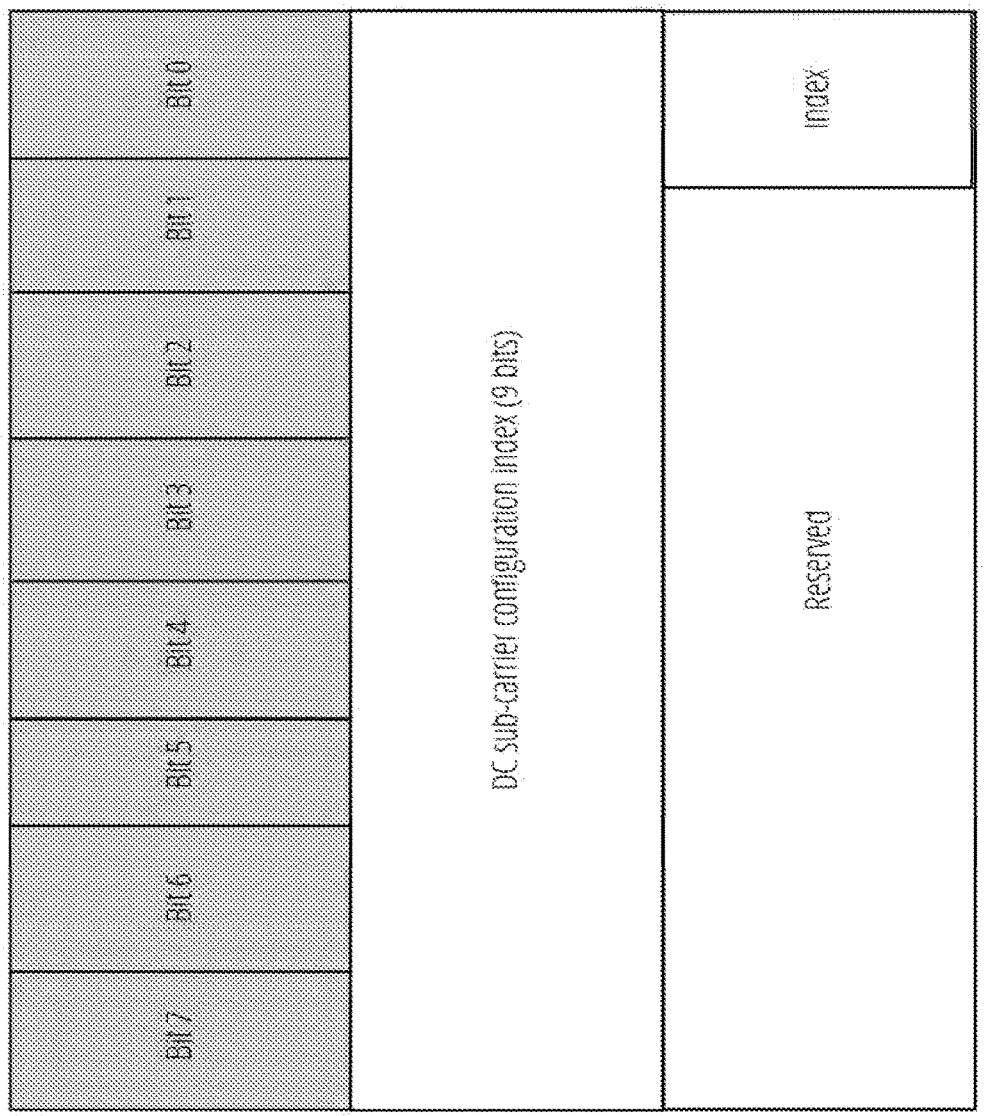
FIG. 5 illustrates an example embodiment of information that may be included in a reduced-size MAC CE used in conjunction with an RRC complete message for reporting Tx DC location information.

UplinkTxDirectConfiguration::=SEQUENCE (SIZE (1 . . . maxNrofTxDC-Config)) OF UplinkTxDirectCurrentList FIG. 5 illustrates an example embodiment 500 of information that may be included in a reduced-size MAC CE used in conjunction with an RRC complete message for reporting Tx DC location information, as further described with respect to the second detailed solution.

The third detailed solution is related to dynamic Signaling with RRC. In particular, the third detailed solution uses RRC messaging alone (i.e., without MAC CE) to provide Tx DC location information. The Tx DC location information for the carrier and corresponding BWPs in UL/SUL for these carriers may be provided via RRC messaging without an request front the network.

In such an embodiment, the UE may trigger the RRC message each time there is a change in the Tx DC location in any of the carriers. In an example, the UE may use a UE Assistance information (UAI) RRC message. In another example, the UE may create a new RRC message just for purposes of Tx DC location reporting.

In addition, a first option of the third detailed solution may include the UE RRC message comprising a snapshot of all the DC Tx locations for all carriers/BWPs in the RRC message. Accordingly, such message may provide a complete picture, for the NW without referring to any other information.

In a second option of the third detailed solution, the UE RRC message ma be a quasi "delta" configuration in that the NW has to combine the content of this RRC message with a previous configuration provided by the UE using the same RRC message in order to derive the Tx DC location information. Accordingly, the second option may reduce the message size of the RRC message, but in turn adds demands to both the NW and the UE to remember the content of the last sent RRC message associated with the Tx DC location.

Notably, the three detailed solutions discussed herein may provide the following benefits: 1. The ability of the to trigger a message to the NW whenever the Tx DC sub-carrier configuration has changed at the UE; 2. The ability of the UE to trigger the sending of location information without RRC in and to accurately provide timely UE Tx DC sub-carrier information for effective UL Tx decoding at the NW; 3. The ability to trigger such information without the explicit RRC transaction, where the NW does not have to respond back with RRC signaling (i.e., acknowledgement); and 4. The avoidance of additional UE and NW processing by skipping ciphering and integrity procedures.

Figure 6:
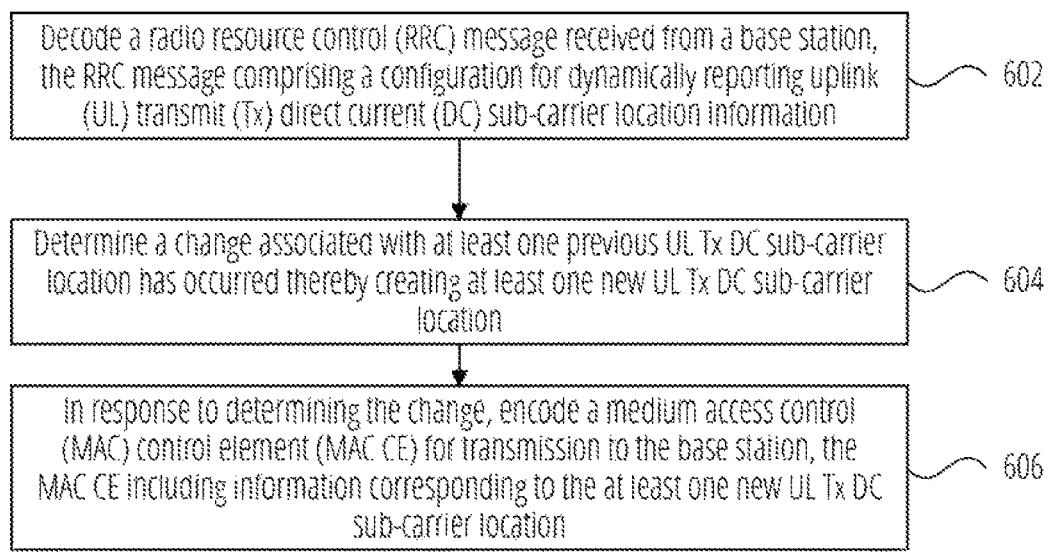
FIG. 6 illustrates a flowchart of a method for reporting UL Tx DC sub-carrier location information.

FIG. 6 illustrates a flowchart of a method 600 for reporting UL Tx DC sub-carrier location information. In block 602, the method 600 decodes a radio resource control (RRC) message received from a base station. The RRC message may comprise a configuration for dynamically reporting uplink (UL) transmit (Tx) direct current (DC) sub-carrier location information. In block 604, the method 600 determines a change associated with at least one previous UL Tx DC sub-carrier location has occurred thereby creating at least one new UL Tx DC sub-carrier location. For instance, the new UL Tx DC sub-carrier location may comprise a different BWP of an active carrier than a BWP of the active carrier associated with the previous UL Tx DC sub-carrier. In block 606, the method 600, in response to determining the change, encodes a medium access control (MAC) control element (MAC CE) for transmission to the base station. The MAC CE may include information corresponding to the at least one new UL Tx DC sub-carrier location.

The method 600 may also include at least one previous UL Tx DC sub-carrier location being associated with a first bandwidth part (BWP) of a carrier and the at least one new UL Tx DC sub-carrier location being associated with a second, different BWP of the carrier. The method 600 may also include the information corresponding to the at least one new UL Tx DC sub-carrier location comprising UL Tx DC sub-carrier location information corresponding to each active carrier associated with the UE.

The method 600 may also include the DE including a bandwidth part (BWP) configuration and the information corresponding to the at least one new UL Tx DC sub-carrier location comprising information associated with each BWP of each active carrier associated with the UE. The method 600 may also include additional information associated with at least one of the BWPs of each active carrier associated with the UE being included in the MAC CE. The additional information may include at least information associated with frequency shifts corresponding to the at least one BWP.

The method 600 may also include the information corresponding to the at least one new UL Tx DC sub-carrier location comprising information corresponding only to an active BWP of each active carrier. The method 600 may also include transmission of the encoded MAC CE being delayed by a timer. The method 600 may also include the MAC CE being encoded for transmission to both a master cell group (MCG) and a secondary cell group (SCG) associated with the UE.

The method 600 may also include the information corresponding to the at least one new UL Tx DC sub-carrier location comprising UL Tx DC sob-carrier location information corresponding to at least one active carrier associated with the MCG and at least one active carrier associated with the SCG. The method 600 may also include the encoded MAC CE being transmitted to the MCG and a primary cell (PCell) of the MCG transmitting the encoded MAC CE to the SCG.

The method 600 may also include the information corresponding to the at least one new UL Tx DC sub-carrier location also comprising UL Tx DC sub-carrier location information corresponding to a UL BWP of a serving cell of the MCG or the SCG. The method may also include the information corresponding to the at least one new UL Tx DC sub-carrier location comprising UL Tx DC sub-carrier location information corresponding to a supplemental UL (SUL) BWP of a serving cell of the MCG or the SCG. The method 600 may also include the information corresponding to the at least one new CL Tx DC sub-carrier location being limited to UL Tx DC sub-carrier location information that has changed since the at least one previous UL Tx DC sub-carrier location.

Figure 7:
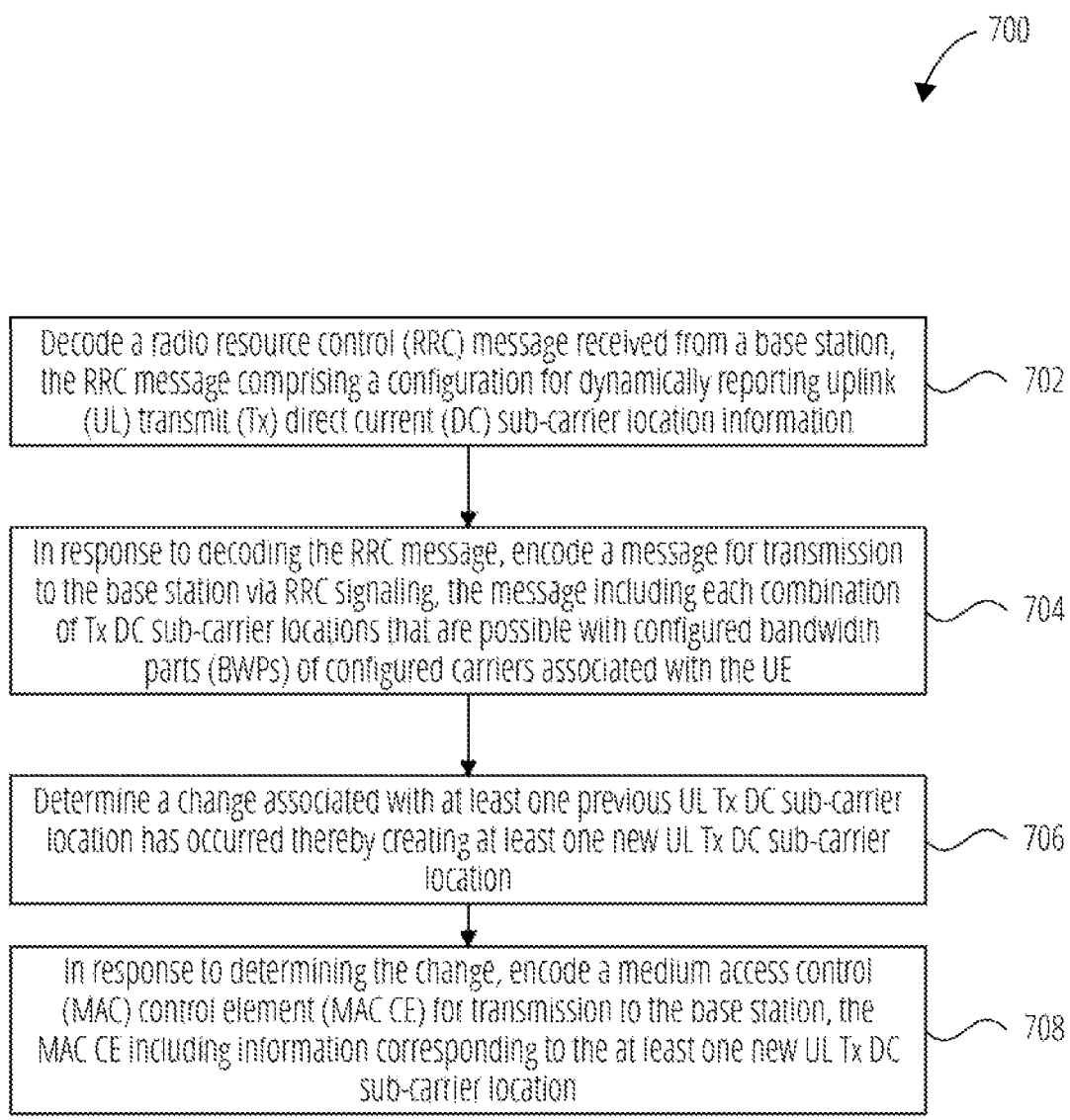
FIG. 7 illustrates a flowchart of a method for reporting UL Tx DC sub-carrier location information.

FIG. 7 illustrates a flowchart of a method 700 for reporting CL Tx DC sub-carrier location information. In block 702, the method 700 decodes a radio resource control (RRC) message received from a base station. The RRC message may comprise a configuration for dynamically reporting uplink (UL) transmit (Tx) direct current (DC) sub-carrier location information. In block 704, the method 700, in response to decoding the RRC message, encodes a message for transmission to the base station via RRC signaling. The message may include each combination of Tx DC sub-carrier locations that are possible with configured bandwidth parts (BWPs) of configured carriers associated with the UE. In block 706, the method 700 determines a change associated with at least one previous UL Tx DC sub-carrier location has occurred thereby creating at least one new UL Tx DC sub-carrier location. For instance, the new UL Tx DC sub-carrier location may comprise a different BWP of an active carrier than a BWP of the active carrier associated with the previous UL Tx DC sub-carrier. In block 708, the method 700, in response to determining the change, encodes a medium access control (MAC) control element (MAC CE) for transmission to the base station. The MAC CE may include information corresponding to the at least one new UL Tx DC sub-carrier location.

The method 700 may also include the encoded message comprising a list of Tx DC sub-carrier locations for each configured BWP of each configured serving cell associated with the UE. The method 700 may also include the information corresponding to the at least one new UL Tx DC sub-carrier location within the MAC CE, comprising an index associated with an entry within the encoded message.

Figure 8:
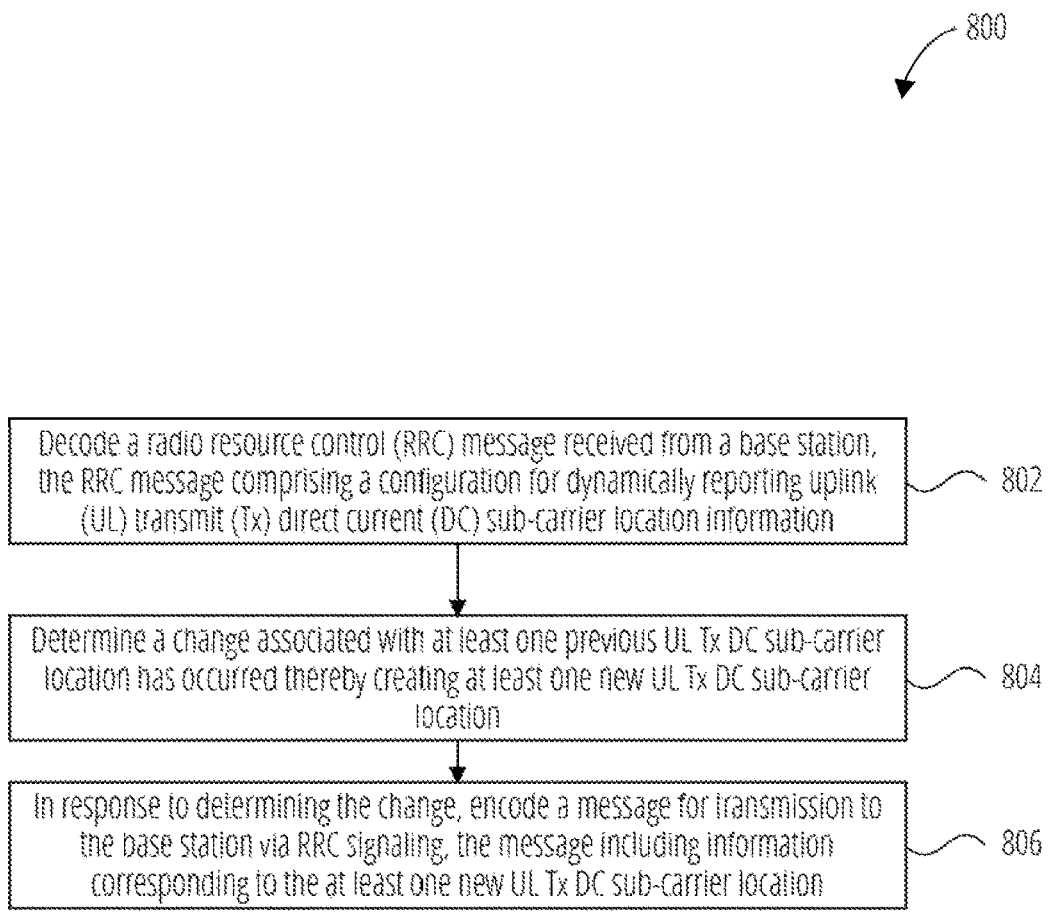
FIG. 8 illustrates a flowchart of a method for reporting UL Tx DC sub-carrier location information.

FIG. 8 illustrates a flowchart of a method 800 for reporting UL Tx DC sub-carrier location information. In block 802, the method 800 decodes a radio resource control (RRC) message received from a base station. The RRC message may comprise a configuration for dynamically reporting uplink (UL) transmit (Tx) direct current (DC) sub-carrier location information. In block 804, the method 800 determines a change associated with at least one previous UL Tx DC sub-carrier location has occurred thereby creating at least one new UL Tx DC sub-carrier location. For instance, the new UL Tx DC sub-carrier location may comprise a different BWP of an active carrier than a BWP of the active carrier associated with the previous UL Tx DC sub-carrier. In block 806, the method 800, in response to determining the change, encodes a message for transmission to the base station via RRC signaling. The message may include information corresponding to the at least one new UL Tx DC sub-carrier location.

The method 800 may also include the encoded message utilizing UE assistance information (UAI) RRC messaging. The method 800 may also include the information corresponding to the at least one new UL Tx DC sub-carrier location including a snapshot of all Tx DC sub-carrier location information associated with each configured bandwidth part (BWP) of each configured carrier associated with the UE. The method 890 may also include the information corresponding to the at least one new UL Tx DC sub-carrier location being limited to UL Tx DC sub-carrier location information that has changed since the at least one previous UL Tx DC sub-carrier location.

Figure 9:
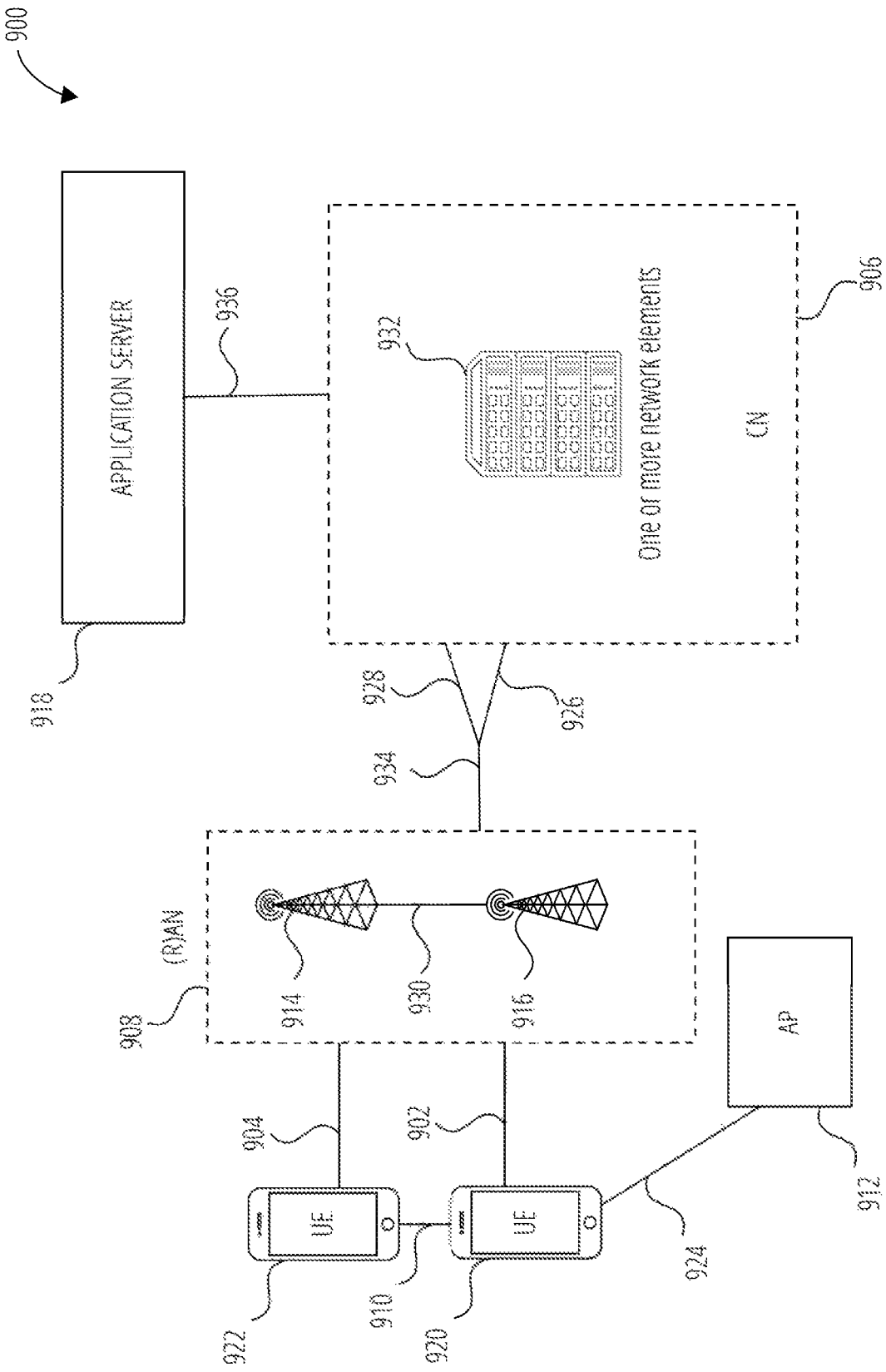
FIG. 9 illustrates a system in accordance with one embodiment.

FIG. 9 illustrates an example architecture of a system 900 of a network, in accordance with various embodiments. The following description is provided for an example system 900 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 9, the system 900 includes UE 922 and UE 920. In this example, the UE 922 and the UE 920 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs) embedded systems, microcontrollers, control modules, engine management systems (EMS), networked or "smart" appliances, MTC devices, M2M, IoT devices, and/or the like.

In some embodiments, the UE 922 and/or the 920 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 922 and UE 920 may be configured to connect, for example, communicatively couple, with an access node or radio access node (shown as (R)AN 908). In embodiments, the (R)AN 908 may be an NG RAN or a SG RAN, an E-UTRAN, or a legacy RAN, such as a UTRAN or GERAN. As used herein, the term "NG RAN" or the like may refer to a (R)AN 908 that operates in an NR SG system, and the term "E-UTRAN" or the like may refer to a (R)AN 908 that operates in an LTE or 4G system. The UE 922 and UE 920 utilize connections (or channels) (shown as connection 904 and connection 902, respectively), each of which comprises a physical communications interface or layer (discussed in further detail below).

In this example, the connection 904 and connection 902 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 922 and UE 920 may directly exchange communication data via a ProSe interface 910. The ProSe interface 910 may alternatively be referred to as a sidelink (SL) interface 110 and may comprise one or more logical channels, including but not limited to a PSCCH, a PSSCH, a PSDCH, and a PSBCH.

The UE 920 is shown to be configured to access an AP 912 (also referred to as "WLAN node," "WLAN," "WLAN Termination," "WT" or the like) via connection 924. The connection 924 can comprise a local wireless connection, such as a connection consistent With any IEEE 802.11 protocol, wherein the AP 912 would comprise a wireless fidelity (Wi-Fi®) router. In this example, the AP 912 may be connected to the Internet without connecting to the core network of the wireless system (described in further detail below). In various embodiments, the UE 920, (R)AN) 908, and AP 912 may be configured to utilize LWA operation and/or LWIP operation. The LWA operation may involve the UE 920 in RRC_CONNECTED being configured by the RAN node 914 or the RAN node 916 to utilize radio resources LTE and WLAN. LWIP operation may involve the UE 920 using WLAN radio resources (e.g., connection 924) via IPsec protocol tunneling to authenticate and encrypt packets (e.g., IP packets) sent over the connection 924. IPsec tunneling may include encapsulating the entirety of original IP packets and adding a new packet header, thereby protecting the original header of the IP packets.

The (R)AN 908 can include one or more AN nodes, such as RAN node 914 and RAN node 916, that enable the Connection 904 and connection 902. As used herein, the terms "access node" "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 900 (e.g., an eNB). According to various embodiments, the RAN node 914 or RAN node 916 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 914 or RAN node 916 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the (RAN/vBBUP and other L2 protocol entities are operated by individual RAN nodes (e.g., RAN node 914 or RAN node 916); a MAC/PHY split wherein RRC, PDCP, RLC, and MAC layers are operated by the CRAN/vBBUP and the PHY layer is operated by individual RAN nodes (e.g., RAN node 914 or RAN node 916); or a "lower PHY" split wherein RRC, PDCP, RLC, MAC layers and upper portions of the PHY layer are operated by the CRAN/vBBUP and loiter portions of the PHY layer are operated by individual RAN nodes. This virtualized framework allows the freed-up processor cotes of the RAN node 914 or RAN node 916 to perform other virtualized applications. In some implementations, an individual RAN node may represent individual gNB-DUs that are connected to a gNB-CU via individual F1 interfaces (not shown by FIG. 9). In these implementations, the gNB-DUs may include one or more remote radio heads or RFEMs, and the gNB-CU may be operated by a server that is located in the (R)AN 908 (not shown) or by a server pool in a similar manner as the CRAN/vBBUP. Additionally, or alternatively, one or more of the RAN node 914 or RAN node 916 may be next generation eNBs (ng-eNBs), which are RAN nodes that provide E-UTRA user plane and control plane protocol terminations toward the UE 922 and UE 920, and are connected to an SGC via an NG interface (discussed infra). In V2X scenarios one or more of the RAN node 914 or RAN node 916 may be or act as RSUs.

The Term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/ software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hot spot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or backhaul network.

The RAN node 914 and/or the RAN node 916 can terminate the air interface protocol and can be the first point of contact for the UE 922 and UE 920. In some embodiments, the RAN node 914 and/or the RAN node 916 can fulfill various logical functions for the (R)AN 908 including, but not limited to, radio network controller (RNC) functions such as radio bearer management, uplink and downlink dynamic radio resource management and data packet scheduling, and mobility management.

In embodiments, the UE 922 and UE 920 can be configured to communicate using OFDM communication signals with each other or with the RAN node 914 and/or the RAN node 916 over a multicarrier communication channel in accordance with various communication techniques, such as, but not limited to, an OFDMA communication technique (e.g., for downlink communications) or a SC-FDMA communication technique (e.g., for uplink and ProSe sidelink communications), although the scope of the embodiments is not limited in this respect. The OFDM signals can comprise a plurality of orthogonal subcarriers.

In some embodiments, a downlink resource grid can be used for downlink transmissions from the RAN node 914 and/or the RAN node 916 to the UE 922 and UE 920, while uplink transmissions can utilize similar techniques. The grid cart be a time-frequency grid, called a resource grid or time-frequency resource grid, which is the physical resource in the downlink in each slot. Such a time-frequency plane representation is a common practice for OFDM systems, which makes it intuitive for radio resource allocation. Each column, and each row of the resource end corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection resource elements the frequency domain, this may represent the smallest quantity of resources that currently can be allocated. There are several different physical downlink channels that are conveyed using such resource blocks.

According to various embodiments, the UE 922 and UE 920 and the RAN node 914 and/or the RAN node 916 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 922 and UE 920 and the RAN node 914 or RAN node 916 may operate using LAA, eLAA, and/or feLAA mechanisms. In these implementations, the UE 922 and UE 920 and the RAN node 914 or RAN node 916 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 922 and UE 920, RAN node 914 or RAN uncle 916, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 922, AP 912, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to of lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on a different frequency bands will experience different pathloss. A primary service cell or may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 922 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher layer signaling to the UE 922 and UE 920. The PDCCH carries information about the transport format and resource allocations related to the PDSCH channel, among other things. It may also inform the UE 922 and UE 920 about the transport format, resource allocation, and HARQ information related to the uplink shared channel. Typically, downlink scheduling (assigning control and shared channel resource blocks to the UE 920 within a cell) may be performed at any of the RAN node 914 or RAN node 916 based on channel quality information fed back from any of the UE 922 and UE 920. The downlink resource assignment information may be sent on the PDCCH used for (e.g., assigned to) each of the UE 922 and UE 920.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or mare CCEs, depending on the size of the DCI and the channel condition. There can be four or more different PDCCH formats defined in LTE with different numbers of CCEs (e.g., aggregation level, L=2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in same situations.

The RAN node 914 or RAN node 916 may be configured to communicate with one another via interface 930. In embodiments where the system 900 is an LTE system (e.g., when CN 906 is an EPC), the interface 930 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 922 from an SeNB for user data; information of PDCP PDUs that were not delivered to a UE 922; information about a current minimum desired buffer size at the Se NB for transmitting to the UE user data; and the like. The X2-C may provide intra-LTE access mobility functionality, including context transfers from source to target eNB, user plane transport control etc.; load management functionality; as well as inter-cell interference coordination functionality.

In embodiments where the system 900 is a SG or NR system (e.g., when CN 906 is an SGC), the interface 930 may be an Xn interface. The Xn interface is defined between two or more RAN nodes (e.g., two of more gNBs and the like) that connect to SGC, between a RAN node 914 (e.g., a gNB) connecting to SGC and an eNB, and/or between two eNBs connecting to 5GC (e.g., CN 906). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 922 in a connected mode (e.g., CM-CONNECTED) including functionality to manage the UE mobility for connected mode between one of more RAN node 914 or RAN node 916. The mobility support may include context transfer from an old (source) serving RAN node 914 to new (target) serving RAN node 916, and control of user plane tunnels between old (source) serving RAN node 914 to new (target) serving RAN node 916. A protocol stack of the Xn-U may include a transport network layer built on Internet Protocol (IP) transport layer, and a GTP-U layer on top of a UDP and/or IP layer(s) to carry user Plane PDUs. The Xn-C protocol stack may include an application layer signaling protocol (referred to as Xn Application Protocol (Xn-AP)) and a transport network layer that is built SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stacks shown and described herein.

The (R)AN 908 is shown to be communicatively coupled to a core network—in this embodiment, CN 906. The CN 904 may comprise one or more network elements 932, which are configured to offer various data and telecommunications services to customers/subscribers (e.g., users of UE 922 and UE 920) who are connected to the CN 906 via the (R)AN 908. The components of the CN 906 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 906 may be referred to as network slice, and a logical instantiation of a portion of the CN 906 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 918 may be an element offering applications that use IP bearer resources with the core network (e.g., UMTS PS domain, LTE PS data services, etc.). The application server 918 can also be configured to support one or more communication services (e.g., VoIP sessions, PTT sessions, group communication sessions, social networking services, etc.) for the UE 922 and UE 920 via the EPC. The application server 918 max communicate with the CN 906 through an IP communications interface 936.

In embodiments, the CN 906 may be an SGC, and the (R)AN 116 may be connected with the CN 906 via an NG interface 934. In embodiments, the NG interface 934 may be split into two parts, an NG user plane (NG-U) interface 926, which carries traffic data between the RAN node 914 or RAN node 916 and a UPF, and the S1 control plane (NG-C) interface 928, which is a signaling interface between the RAN node 914 or RAN node 916 and AMFs.

In embodiments, the CN 906 may be a SG CN, while in other embodiments, the CN 906 may be an EPC). Where CN 906 is an EPC, the (R)AN 116 may be connected with the CN 906 via an S1 interface 934. In embodiments, the S1 interface 934 may be split into two parts, an S1 user plane (S1-U) interface 926, which carries traffic data between the RAN node 914 or RAN node 916 and the S-GW, and the S1-MME interface 928, which is a signaling interface between the RAN node 914 or RAN node 910 and MMEs.

Figure 10:
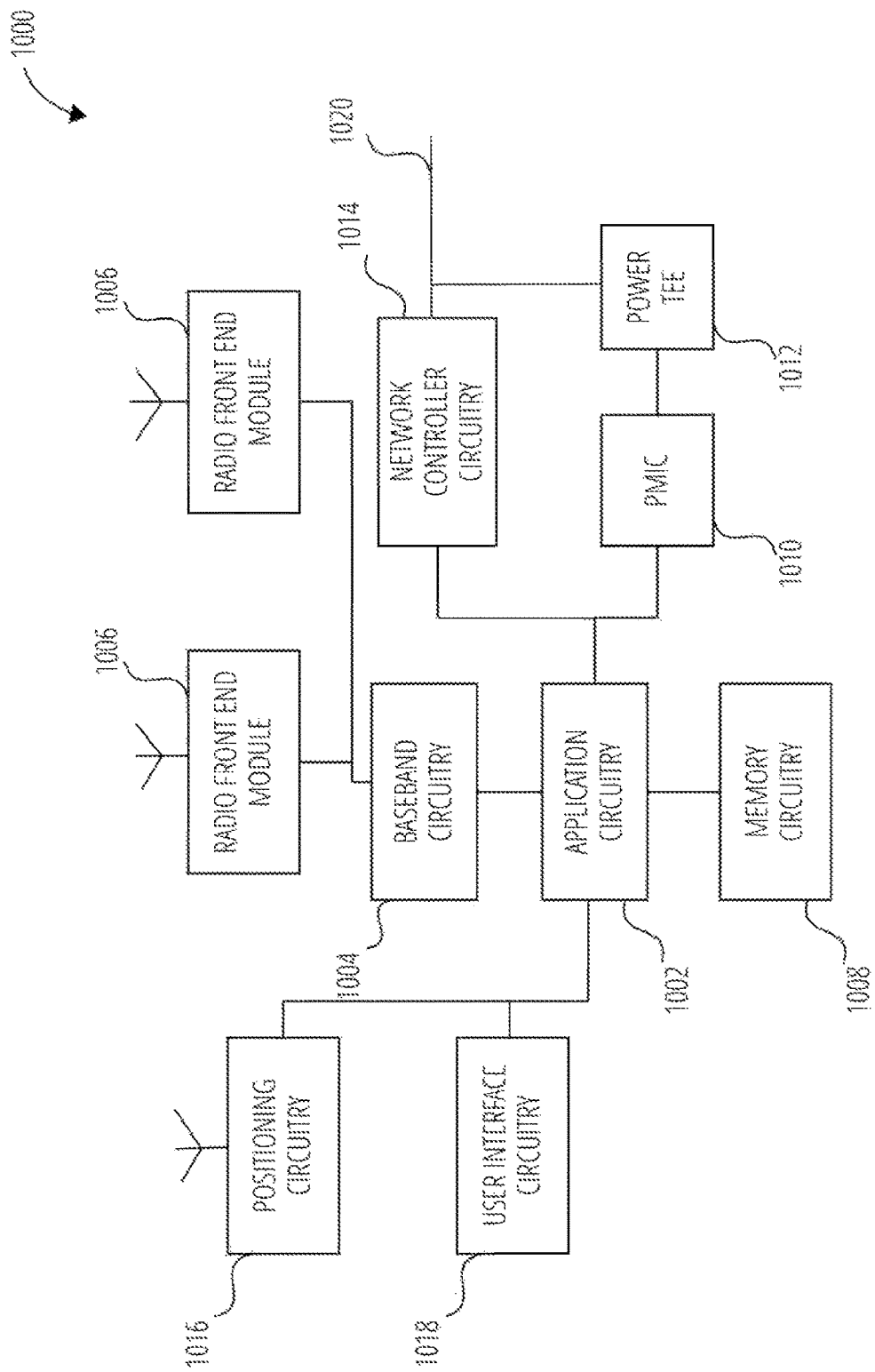
FIG. 10 illustrates an infrastructure equipment in accordance with one embodiment.

FIG. 10 illustrates an example of infrastructure equipment 1000 in accordance with various embodiments. The infrastructure equipment 1000 may be implemented as a base station, radio head, RAN node, AN, application server, and/or any other element/device discussed herein. In other examples, the infrastructure equipment 1000 could be implemented in or by a UE.

The infrastructure equipment 1000 includes application circuitry 1002, baseband circuitry 1004 one or more radio from end module 1006 (RFEM) memory circuitry 1008, power management integrated circuitry (shown as PMIC 1010), power tee circuitry 1012, network controller circuitry 1014, network interface connector 1020, satellite positioning circuitry 1016, and user interface circuitry 1018. In some embodiments, the device infrastructure equipment 1000 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1002 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1002 may be coupled with or may include memory/storage elements and may be configured to execute instructions stored in the memory storage to enable various applications or operating systems to run on the infrastructure equipment 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1002 may include, for example, one or more processor cares (CPUs), one or more application processors, one or more graphics processing units (GPUs), one or more reduced instruction set computing (RISC) processors, one or more Acorn RISC Machine (ARM) processors, one or more complex instruction set computing (CICS) processors, one or more digital signal processors (DSP), one or more FPGAs, one or more PLDs, one or more ASICs, one or more microprocessors or controllers, or any suitable combination thereof. In some embodiments, the application circuitry 1002 may comprise, may be, a special-purpose processor/controller to operate according to the various embodiments herein. As examples, the processor(s) of application circuitry 1002 may include one or more Intel Pentium®, Core®, Xeon® processor(s); Advanced Micro Devices (AMD) Ryzen® processor(s), Accelerated Processing Units (APUs), or Epye® processors; ARM-based processor(s) licensed from ARM Holdings, Ltd. such as the ARM Cortex-A family of processors and the ThunderX2® provided by Cavium™, Inc., a MIPS-based design from MIPS Technologies, Inc. such as MIPS Warrior P-class processors; and/or the like. In some embodiments, the infrastructure equipment 1000 may not utilize application circuitry 1002, and instead may include a special-purpose processor/controller to process IP data received from an EPC or 5GC, for example.

In some implementations, the application circuitry 1002 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1002 may comprise logic blocks or logic fabric, and other interconnected resources That may be programmed to perform various functions, such as the procedures, methods, functions, etc. of the various embodiments discussed herein. In such embodiments, the circuitry of application circuitry 1002 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 1004 may be implemented, for example, as a solder-down substrate including one or more integrated circuits, a single packaged integrated circuit soldered to a main circuit board or a multi-chip module containing two or more integrated circuits.

The user interface circuitry 1018 may include one or more user interfaces designed to enable user interaction with the infrastructure equipment 1000 or peripheral component interfaces designed to enable peripheral component interaction with the infrastructure equipment 1000. User interfaces may include, but are not limited to, one or more physical or virtual buttons (e.g. a reset button), one or more indicators (e.g. light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non volatile memory port, a universal serial bus (USB) port, an audio jack, a power supply interface, etc.

The radio front end module 1006 may comprise a millimeter wave (mmWave) radio front end module (RFEM) and one or more sub-mm Wave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1006, which incorporates both mmWave antennas and sub-mmWave.

The memory circuitry 1008 may include one or more of Volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 1008 may be implemented as one or more of solder down packaged integrated circuits, socketed memory modules and plug in memory cards.

The PMIC 1010 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power the circuitry 1012 may provide for electrical power drawn from a network cable to provide both power supply and data connectivity to the infrastructure equipment 1000 using a single cable.

The network controller circuitry 1014 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1000 via network interface connector 1020 using a physical connection, which may be electrical (commonly referred to as a "copper interconnect"), optical, or wireless. The network controller circuitry 1014 may include one or more dedicated processors and/or FPGAs to communicate using one or more of the aforementioned protocols. In some implementations, the network controller is 1014 may include multiple controllers to provide connectivity to other networks using the same or different protocols.

The positioning circuitry 1016 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1016 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1016 may include a Micro-Technology for Positioning, Navigation, and Timing (Micro-PNT) IC that uses a master timing clock to perform position tracking/estimation without GNSS assistance. The positioning circuitry 1016 may also be part of, or interact with, the baseband circuitry 1004 and/or radio front end module 1006 to communicate with the nodes and components of the positioning network. The positioning circuitry 1016 may also provide position data and/or time data to the application circuitry 1002, which may use the data to synchronize operations with various infrastructure, or the like. The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 11:
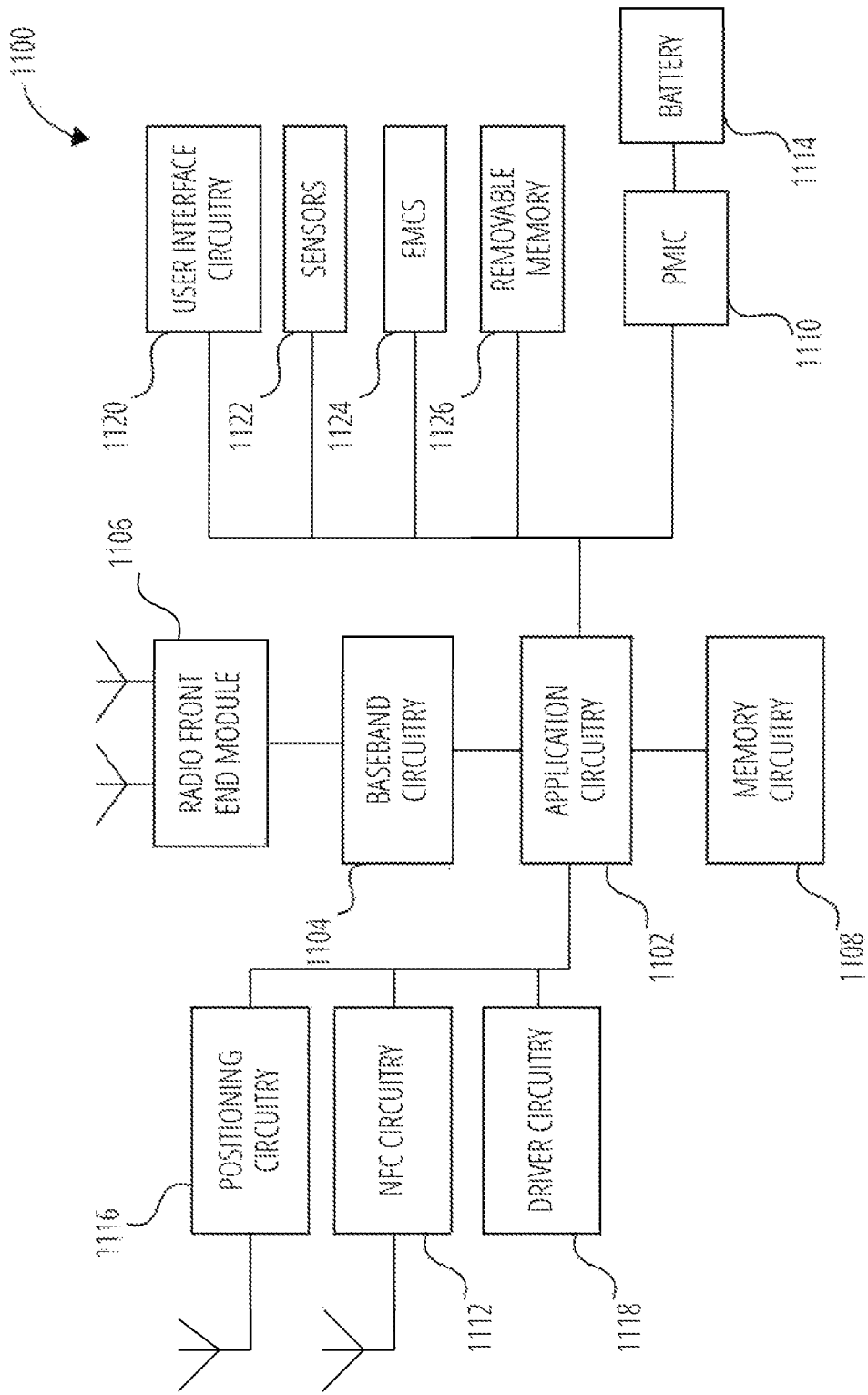
FIG. 11 illustrates a platform in accordance with one embodiment.

FIG. 11 illustrates au example of a platform 1100 in accordance with various embodiments. In embodiments, the computer platform 1100 may be suitable for use as UEs, application servers, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1102 includes circuitry such as, but not limited to one or more processors (or processor cores), cache memory, and one or more of LDOs interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1102 may be coupled with or may include memory/storage elements and may be configured to execute instructions stored in the memory/storage to enable various applications of operating systems to run on the platform 1100. In some implementations, the memory/storage elements may be on-chip memory circuitry, which may include any suitable volatile and/or non-volatile memory, such as DRAM, SRAM EPROM, EEPROM, Flash memory, solid-state memory, and/or any other type rat memory device technology, such as those discussed herein.

The processor(s) of application circuitry 1102 may include, for example, one or more processor cores, one or more application processors, one or more GPUs, one or more RISC processors, one or more ARM processors, one or mare CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1102 may comprise, or may be, a special-purpose processor/controller to operate according to the various embodiments herein.

As examples, the processor(s) of application circuitry 1102 may include an Intel® Architecture Core™ based processor, such as a Quark™, Atom™, an i3, an i5, an i7, or an MCU-class processor, or another such processor available from Intel® Corporation. The processors of the application circuitry 1102 may also be one or more of Advanced Micro Devices (AMD) Ryzen® processor(s) or Accelerated Processing Units (APUs); AS-A9 processor(s) from Apple at Snapdragon™ processor(s) from Qualcomm® Technologies, Inc., Texas Instruments, Inc.® Open Multimedia Applications Platform (OMAP)™ processor(s); a MIPS-based design from MIPs Technologies, Inc. such as MIPS Warrior M-class, Warrior I-class, add Warrior P-class processors; an ARM-based design licensed from ARM Holdings, Ltd., such as the ARM Cortex-A, Cortex-R, and Cortex-M family of processors; or the like. In some implementations, the application circuitry 1102 may be a part of a system on a chip (SoC) which the application circuitry 1102 and other components are formed into a single integrated circuit, or a single package, such as the Edison™ or Galileo™ SoC boards from Intel® Corporation.

Additionally or alternatively, application circuitry 1102 may include circuitry such as, but not limited to, one or more a field-programmable devices (FPDs) such as FPGAs and the like programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1102 may comprise logic blocks or logic fabric, and other interconnected resource that may be programmed to perform various functions, such as the procedures, methods, functions, etc. of the various embodiments discussed herein. In such embodiments, the circuitry of application circuitry 1102 may include memory cells erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tasks (LUTs) and the like.

The noseband circuitry 1104 may be implemented, for example, as a solder-down substrate including one or more integrated circuits, a single packaged integrated circuit soldered to a main circuit board or a multi-chip module containing two or more integrated circuits.

The radio front end module 1106 may comprise a millimeter wave (mmWave) radio front end module (RFEM) and one of more sub-mmWave radio frequency integrated circuits (RFICs). In some implementations, the one or more sub-mmWave may be physically separated from the mmWave RFEM. The RFICs may include connections to one or more antennas of antenna arrays, and the RFEM may be connected to multiple antennas. In alternative implementations, both mmWave and sub-mmWave radio functions may be implemented in the same physical radio front end module 1106, which incorporates both mmWave antennas and sub-mmWave.

The memory circuitry 1108 may include any number and type of memory devices used to provide for a given amount of system memory. As examples, the memory circuitry 1108 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM) magnetoresistive random access memory (MRAM), etc. The memory circuitry 1108 may be developed in accordance with a Joint Electron Devices Engineering Council (JEDEC) low power double data rate (LPDDR)-based design, such as LPDDR2, LPDDR3, LPDDR4, or the like. Memory circuitry 1108 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1108 maybe on-die memory or registers associated with the application circuitry 1102. To provide for persistent storage of information such as data, applications, operating systems and so forth, memory circuitry 1108 max include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1100 may incorporate the three-dimensional (3D) cross-point XPOINT) memories from Intel® and Micron®.

The removable memory 1126 may include devices, circuitry, enclosures/housings, ports or receptacles, etc. used to couple portable data storage devices with the platform 1100. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1100 may also include interface circuitry (not shown) that is used to connect external devices with the platform 1100. The external devices connected to the platform 1100 via the interface circuitry include sensors 1122 and electro-mechanical components (shown as EMCs 1124), as well as removable memory devices coupled to removable memory 1126.

The sensors 1122 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers, microelectromechanical systems (MEMS) or nanoelectromechanical systems (NEMS) comprising 3-axis accelerometers, 3-axis gyroscopes, and/or magnetometers; level sensors; flow sensors temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1124 include devices, modules, or subsystems whose purpose is to enable platform 1100 to change its state, position, and/or orientation, or move or control a mechanism or (sub)system. Additionally, EMCs 1124 may be configured to generate and send messages/signaling to other components of the platform 1100 to indicate a current state of the EMCs 1124. Examples of the EMCs 1124 include one or more power switches, relays including electromechanical relays (EMRs) and/or solid state relays (SSRs), actuators valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1100 is configured to operate one or more EMCs 1124 based on one or more captured events and/or instructions or control signals received from a service provider and/or various clients. In some implementations, the interface circuitry may connect the platform 1100 with positioning circuitry 1116. The positioning circuitry 1116 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1116 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1116 may include a Micro-PNT IC that uses a master tinting clock to perform position tracking/estimation without GNSS assistance. The positioning circuitry 1116 may also be part of or interact with, the baseband circuitry 1104 and/or radio front end module 1106 to communicate with the nodes and components of the positioning network. The positioning circuitry 1116 may also provide position data and/or time data to the application circuitry 1102, which may use the data to synchronize operations with various infrastructure (e.g., radio base stations), for turn-by-turn navigation applications, or the like.

In some implementations, the interface circuitry may connect the platform 1100 with Near-Field Communication circuitry (shown as NFC circuitry 1112). The NFC circuitry 1112 is configured to provide contactless, short-range communications based on radio frequency identification (RFID) standards, wherein magnetic field induction is used to enable communication between NFC circuitry 1112 and NFC-enabled devices external to the platform 1100 (e.g., an "NFC touchpoint"). NFC circuitry 1112 comprises an NFC controller coupled with an antenna element and a processor coupled with the NFC controller. The NFC controller may be a chip/IC providing NFC functionalities to the NFC circuitry 1112 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1112, or initiate data transfer between the NFC circuitry 1112 and another active NFC device (e.g., a smartphone or an NFC-enabled POS terminal) that is proximate to the platform 1100.

The driver circuitry 1118 may include software and hardware elements that operate to control particular devices that are embedded in the platform 1100, attached to the platform 1100, or otherwise communicatively coupled with the platform 1100. The driver circuitry 1118 may include individual drivers allowing other components of the platform 1100 to interact with or control various input/output (I/O) devices that may be present within, or connected to, the platform 1100. For example, driver circuitry 1115 may include a display driver to control and allow access to a display device, a touchscreen driver to control and allow access to a touch screen interlace of the platform 1100, sensor drivers to obtain sensor readings of sensors 1122 and control and allow access to sensors 1122, EMC drivers to obtain actuator positions of the EMCs 1124 and/or control and allow access to the EMCs 1124, a camera driver to control and allow access to an embedded image capture device, audio drivers to control and allow access to one or more audio devices.

The power management integrated circuitry (shown PMIC 1101 (also referred to as "power management circuitry") may manage power provided to various components of the platform 1100. In particular, with respect to the baseband circuitry 1104, the PMIC 1110 may control power-source selection, voltage scaling, battery charging, or DC-to-DC conversion. The PMIC 1110 may often be included when the platform 1100 is capable of being powered by a battery 1114, for example, when the device is included in a UE.

In some embodiments, the PMIC 1110 may control, or otherwise be part of, various power saving mechanisms of the platform 1100. For example, if the platform 1100 is in an RRC_Connected state, where it is still connected to the RAN node as it expects to receive traffic shortly, then it may enter a state known as Discontinuous Reception Mode (DRX) after a period of inactivity. During this state, the platform 1100 may power down for brief intervals of time and thus save power, if there is no data traffic activity for an extended period of time, then the platform 1100 may transition off to an RRC_Idle state, where it disconnects from the network and does not perform operations such as channel quality feedback, handover, etc. The platform 1100 goes into a very low power state and it performs paging where again it periodically wakes up to listen to the network and then powers down again. The platform 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1114 may power the platform 1100, although in some examples the platform 1100 may be mounted deployed in a fixed location, and may have a power supply coupled to an electrical grid. The battery 1114 may be a lithium ion battery, a metal-air battery, such as a zinc-air battery, an aluminum-air battery, a lithium-air battery, and the like. In some implementations, such as in V2X applications, the battery 1114 may be a typical lead-acid automotive battery.

In some implementations, the battery 1114 may be a "smart battery," which includes or is coupled with a Battery Management System (BMS) or battery monitoring integrated circuitry. The BMS may be included in the platform 1100 to track the state of charge (SoCh) of the battery 1114. The BMS may be used to monitor other parameters of the buttery 1114 to provide failure predictions, such as the state of health (SoH) and the state of function (SoF) of the battery 1114. The BMS may communicate the information of the battery 1114 to the application circuitry 1102 or other components of the platform 1100. The BMS may also include an analog-to-digital (ADC) convertor that allows the application circuitry 1102 to directly monitor the voltage of the battery 1114 or the current flow from the battery 1114. The battery parameters may be used to determine actions that the platform 1100 may perform, such as transmission frequency, network operation, sensing frequency, and the like.

A power block, or other power supply coupled to an electrical grid may be coupled with the BMS to charge the battery 1114. In some examples, the power block may be replaced with a wireless power receiver to obtain the power wirelessly for example, through a loop antenna in the computer platform 1100. In these examples, a wireless battery charging circuit may be included in the BMS. The specific charging circuits chosen may depend on the site of the battery 1114, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1120 includes various input/output (I/O) devices present within, or connected to, the platform 1100, and includes one or more user interfaces designed to enable user interaction with the platform 1100 and/or peripheral component interfaces designed to enable peripheral component interaction with the platform 1100. The user interface circuitry 1120 includes input device circuitry and output device circuitry. Input device circuitry includes any physical or virtual means for accepting an input including, inter alia, one or more physical or virtual buttons (e.g., a reset button), a physical keyboard, keypad, touchpad touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being geminated or produced from the operation of the platform 1100. The output device circuitry may also include speakers or other audio emitting devices, printer(s), and/or the some embodiments, the sensors 1122 may be used as the input, device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio Jack, a power supply interface, etc.

Although not shown, the components of platform 1100 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an interface, an SPI interface, point-to-point interfaces, and a power bus, among others.

Figure 12:
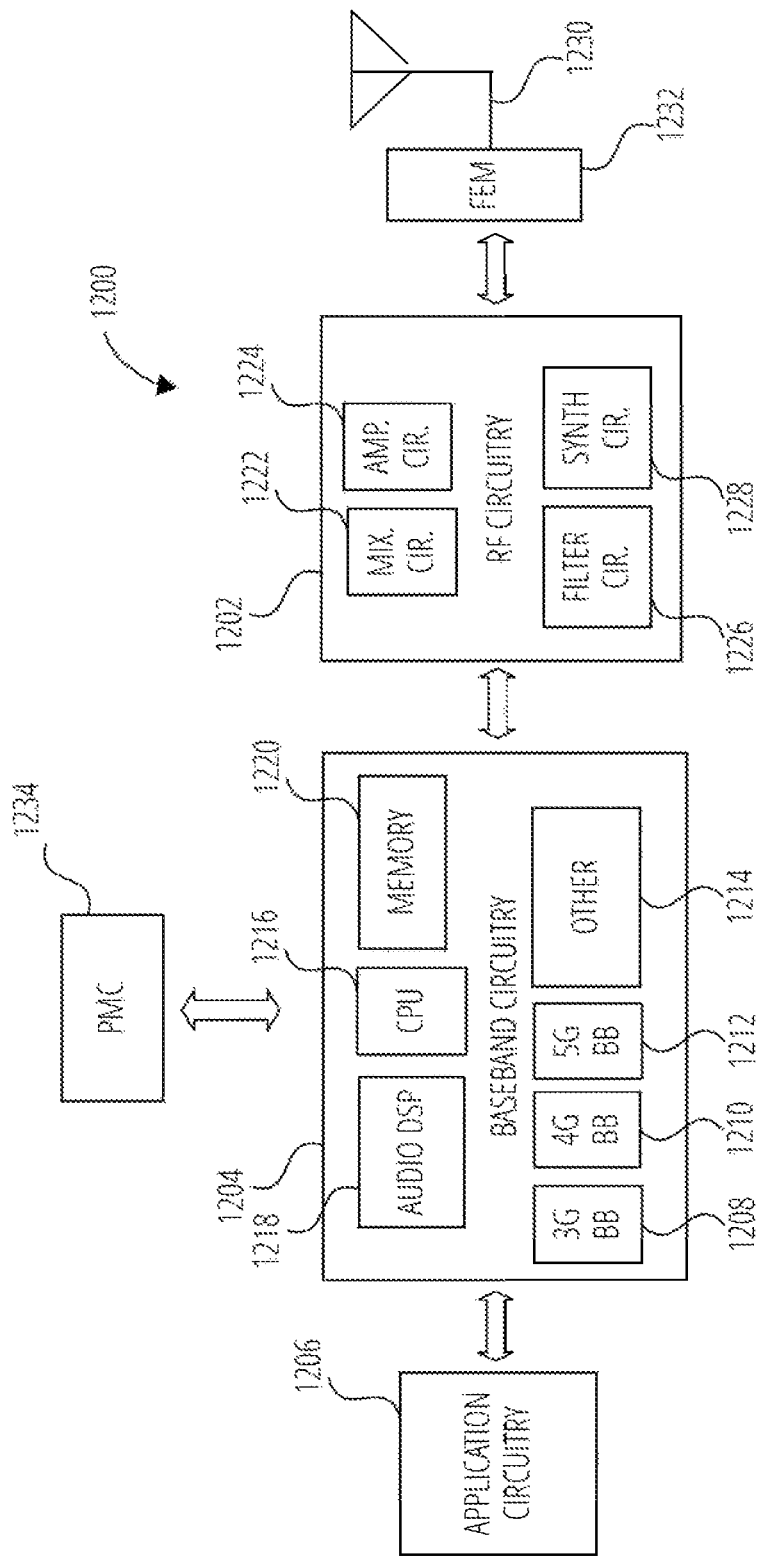
FIG. 12 illustrates a device in accordance with one embodiment.

FIG. 12 illustrates example components of a device 1200 in accordance with some embodiments. In some embodiments, the device 1200 may include application circuitry 1206, baseband circuitry 1204, Radio Frequency (RF) circuitry (shown as RF circuitry 1202), front-end module (FEM) circuitry (shown as FEM circuitry 1232), one or more antennas 1230, and power management circuitry (PMC) (shown as PMC 1234) coupled together at least as shown. The components of the illustrated device 1200 may be included in a UE or a RAN node. In some embodiments, the device 1200 may include fewer elements (e.g., a RAN node may not utilize application circuitry 1206, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1206 may include one or more application processors. For example, the application circuitry 1206 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1206 may process IP data packets received from an EPC.

The baseband circuitry 1204 may include circuitry such as, but not limited to, one or more single-core or multi-core processors. The baseband circuitry 204 may include one or more baseband processors or control logic to process baseband signals received from a receive signal path of the RF circuitry 1202 and to generate baseband signals for a transmit signal path or the RF circuitry 1202. The baseband circuitry 1204 may interface with the application circuitry 1206 for generation and processing of the baseband signals and for controlling operations of the RF circuitry 1202. For example, in some embodiments, the baseband circuitry 1204 may include a third generation (3G) baseband processor (3G baseband processor 1208), a fourth generation (4G) baseband processor (4G baseband processor 1210), a fifth generation (5G) baseband processor (5G baseband processor 1212), or other baseband processor(s) 1214 for other existing generations, generations in development or to be developed in the future (e.g., second generation (2G), sixth generation (6G), etc.). The baseband circuitry 1204 (e.g., one or more of baseband processors) may handle various radio control functions that enable communication with one or more radio networks via the RF circuitry 1202. In other embodiments, some or all of the functionality of the illustrated baseband processors may be included in modules stored in the memory 1220 and executed via a Central Processing Unit (CPU 1216). The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include a digital signal processor (DSP), such as one or more audio DSP(s) 1218. The one or more audio DSP(s) 1218 may include elements for compression/decompression and echo cancellation and may include other suitable processing elements in other embodiments. Components of the baseband circuitry may be suitably combined in a single chip, a single chipset or disposed on a same circuit board in some embodiments. In some embodiments, some or all of the constituent components of the baseband circuitry 1204 and the application circuitry 1206 may be implemented together such as, for example, on a system on a chip (SOC).

In some embodiments, the baseband circuitry 1204 may provide for communication compatible with one or more radio technologies. For example, some embodiments, the baseband circuitry 1204 may support communication with an evolved universal terrestrial radio access network (EU-TRAN) or other wireless metropolitan area networks (WAN), a wireless local area network (WLAN), or a wireless personal area network (WPAN). Embodiments in which the baseband circuitry 1204 is configured to support radio communications of more than one wireless protocol may be referred to as multi-mode baseband circuitry.

The RF circuitry 1202 may enable communication with wireless networks using modulated electromagnetic radiation through a non-solid medium. In various embodiments, the RF circuitry 1202 may include switches, filters, amplifiers, etc. to facilitate the communication with the wireless network. The RF circuitry 1202 may include a receive signal path which may include circuitry to down-convert RF signals received from the FEM circuitry 1232 and provide baseband signals to the baseband circuitry 1204. The RF circuitry 1202 may also include a transmit signal path which may include circuitry to up-convert baseband signals provided by the baseband circuitry 1204 and provide RF output signals to the FEM circuitry 1232 for transmission.

In some embodiments, the receive signal path of the RF circuitry 1202 may include mixer circuitry 1222, amplifier circuitry 1224 and filter circuitry 1226. In some embodiments, the transmit signal path of the RF circuitry 1202 may in elude filter circuitry 1226 and mixer circuitry 1332. The RF circuitry 1202 may also include synthesizer circuitry 1228 for synthesizing a frequency for use by the mixer circuitry 1222 of the receive signal path and the transmit signal path. In some embodiments, the mixer circuitry 1222 of the receive signal path may be configured to down-convert RF signals received from the FEM circuitry 1232 based an the synthesized frequency provided by synthesizer circuitry 1228. The amplifier circuitry 1224 may be configured to amplify the down-converted signals and the filter circuitry 1226 may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, the mixer circuitry 1222 of the receive signal path may comprise passive mixers, although the scope of the embodiments is not limited in this respect.

In some embodiments, the mixer circuitry 1222 of the transmit signal path may be configured to up-convert input baseband signals based on the synthesized frequency provided by the synthesizer circuitry 1228 to generate RF output signals for the FEM circuitry 1232. The baseband signals may be provided b the baseband circuitry 1204 and may be filtered by the filter circuitry 1226.

In some embodiments, the mixer circuitry 1222 of the receive signal path and the mixer circuitry 1222 of the transmit signal path may include two or more mixers and ma be arranged for quadrature downconversion and upconversion, respectively. In some embodiments, the mixer circuitry 1222 of the receive signal path and the mixer circuitry 1222 of the transmit signal path may include two or more mixers and may be arranged for image rejection (e.g., Hartley image rejection). In some embodiments, the mixer circuitry 1222 of the receive signal path and the mixer circuitry 1222 may be arranged for direct downconversion and direct upconversion, respectively. In some embodiments, the mixer circuitry 1222 of the receive signal path and the mixer circuitry 1222 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1202 may include analog-to-digital converter (ADC) and digital-to-analog converter (DAC) circuitry and the baseband circuitry 1294 may include a digital baseband interface to communicate with the RF circuitry 1202.

In some dual-mode embodiments, a separate radio IC circuitry may be provided for processing signals for each spectrum, although the scope of the embodiments is not limited in this respect.

In some embodiments, the synthesizer circuitry 1228 may be a fractional-N synthesizer or a fractional N/N+1 synthesizer, although the scope of the embodiments is not limited in this respect as other types of frequency synthesizers may be suitable. For example, synthesizer circuitry 1228 may be a delta-sigma synthesizer, a frequency multiplies, or a synthesizer comprising a phase-locked loop with a frequency divider.

The synthesizer circuitry 1228 may be configured to synthesize an output frequency for use by the mixer circuitry 1222 of the RF circuitry 1202 based on a frequency input and a divider control input. In some embodiments, the synthesizer circuitry 1228 may be a fractional N/N+1 synthesizer.

In some embodiments, frequency input may be provided by a voltage controlled oscillator (VCO), although that is not a requirement. Divider control input may be provided by either the baseband circuitry 1204 or the application circuitry 1206 (such as an applications processor) depending on the desired output frequency. In some embodiments, a divider control input (e.g., N) may be determined from a look-up table based on a channel indicated by the application circuitry 1206.

Synthesizer circuitry 1228 of the RF circuitry 1202 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N (e.g., based on a carry out) to provide a fractional division ratio. In some example embodiments, the DLL may include a set or cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1228 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1202 may include an IQ/polar converter.

The FEM circuitry 1232 may include a receive signal path which may include circuitry configured to operate on RF signals received from one or more antennas 1230, amplify the received signals, and provide the amplified versions of the received signals to the RF circuitry 1202 for further processing. The FEM circuitry 1232 may also include a transmit signal path Which may include circuitry configured to amplify signals for transmission provided by the RF circuitry 1202 for transmission by one or more of the one or more antennas 1230. In various embodiments, the amplification through the transmit or receive signal paths may be done solely in the RF circuitry 1202, solely, in the FEM circuitry 1232, or in both the RF circuitry 1202 and the FEM circuitry 1232.

In some embodiments, the FEM circuitry 1232 may include a TX/RX switch to switch between transmit mode and receive mode operation. The FEM circuitry 1232 may include a receive signal path and a transmit signal path. The receive signal path of the FEM circuitry 1232 may include an LNA to amplify received RF signals and provide the amplified received RF signals as an output (e.g., to the RF circuitry 1202). The transmit signal path of the FEM circuitry 1232 may include a power amplifier (PA) to amplify input RF signals (e.g., provided by the RF circuitry 1202), and one or more filters to generate RF signals for subsequent transmission (e.g., by one or more of the one or more antennas 1230).

In some embodiments, the PMC 1234 may manage power provided to the baseband circuitry 1204. In particular, the PMC 1234 may control power-source selection, voltage scaling, battery charging, or DC-to-DC conversion. The PMC 1234 may often be included when the device 1200 is capable of being powered by a battery, for example, when the device 1200 is included in a UE. The PMC 1234 may increase the power conversion efficiency while providing desirable implementation size and heat dissipation characteristics.

FIG. 12 shows the PMC 1234 coupled only with the baseband circuitry 1204. However, in other embodiments, the PMC 1234 may be additionally or alternatively coupled with, and perform similar power management operations for, other components such as, but nut limited to, the application circuitry 1206, the RF circuitry 1202, or the FEM circuitry 1232.

In some embodiments, the PMC 1234 may control, or otherwise be part of, various power saving mechanisms of the device 1200. For example, if the device 1200 is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during, this time incurs a large delay and it is assumed the delay is acceptable.

Processors of the application circuitry 1206 and processors of the baseband circuitry 1204 may be used to execute elements of one or more instances of a protocol stack. For example, processors of the baseband circuitry 1204, alone or in combination, may be used to execute Layer 3, Layer 2, or Layer 1 functionality, while processors of the application circuitry 1206 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in farther detail below. As referred to herein. Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
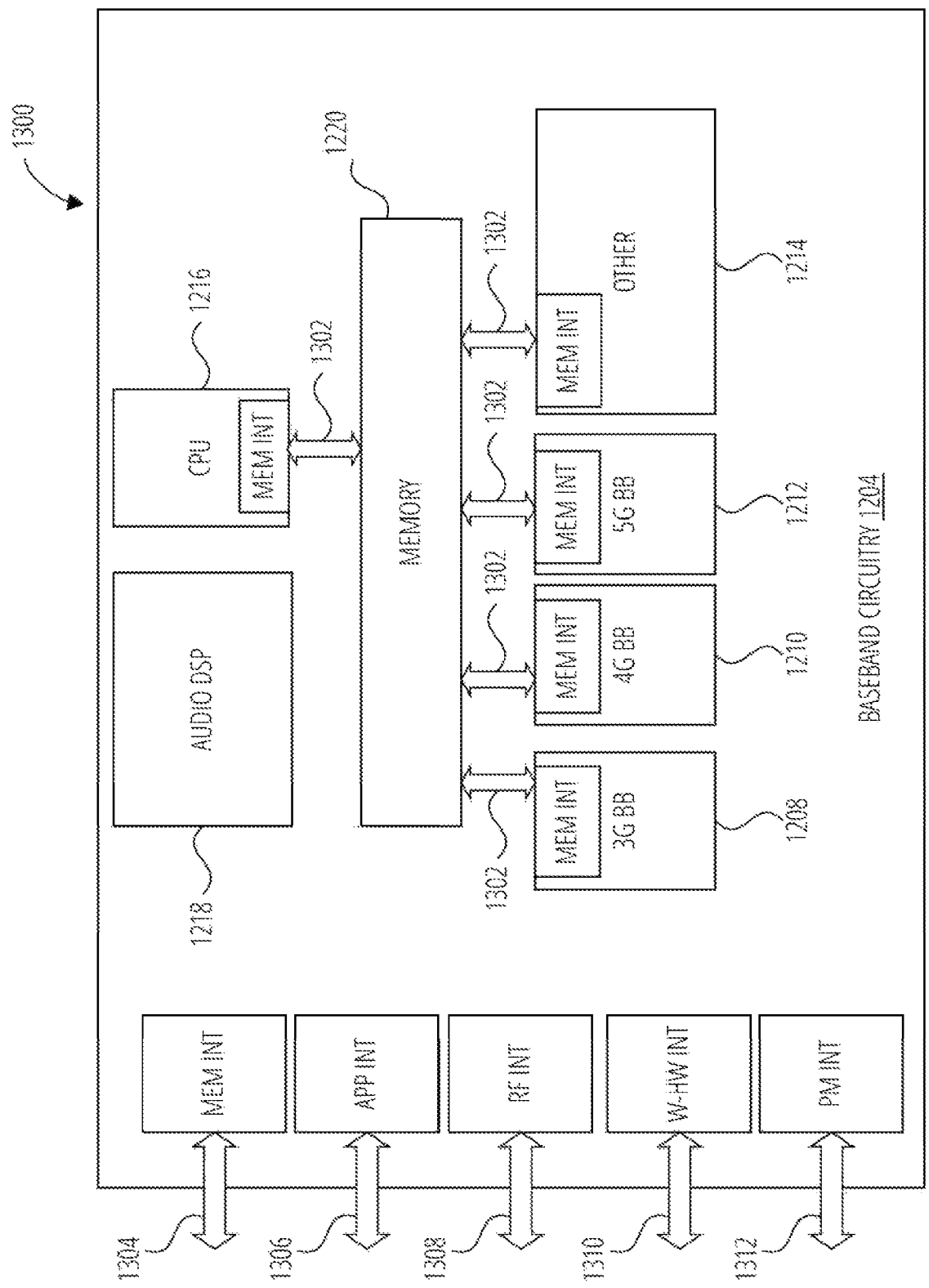
FIG. 13 illustrates example interfaces in accordance with one embodiment.

FIG. 13 illustrates example interfaces 1300 of baseband circuitry in accordance with some embodiments. As discussed above, the baseband circuitry 1204 of FIG. 12 may comprise 3G baseband processor 1208, 4G baseband processor 1210, 5G baseband processor 1212, other baseband processor(s) 1214, CPU 1216, and a memory 1220 utilized by said processors. As illustrated, each of the processors may include a respective memory interface 1302 to send/receive data to/from the memory 1220.

The baseband circuitry 1204 may further include one or more interfaces to communicatively couple to other circuitries/devices, such as a memory interface 1304 (e.g., an interface to send/receive data to/from memory external to the has hand circuitry 1204), an application circuitry interface 1306 (e.g., an interface to send/receive data to/from the application circuitry 1206 of FIG. 12), an RF circuitry interface 1308 (e.g., an interface to send/receive data to/from RF circuitry 1202 of FIG. 12), a wireless hardware connectivity interface 1310 (e.g., an interface to send/receive data to/from Near Field Communication (NFC) components, Bluetooth® components (e.g., Bluetooth® Low Energy) Wi-Fi® components, and other communication components), and a power management interface 1312 (e.g., an interface to send/receive power or control signals to/from the PMC 1234.

Figure 14:
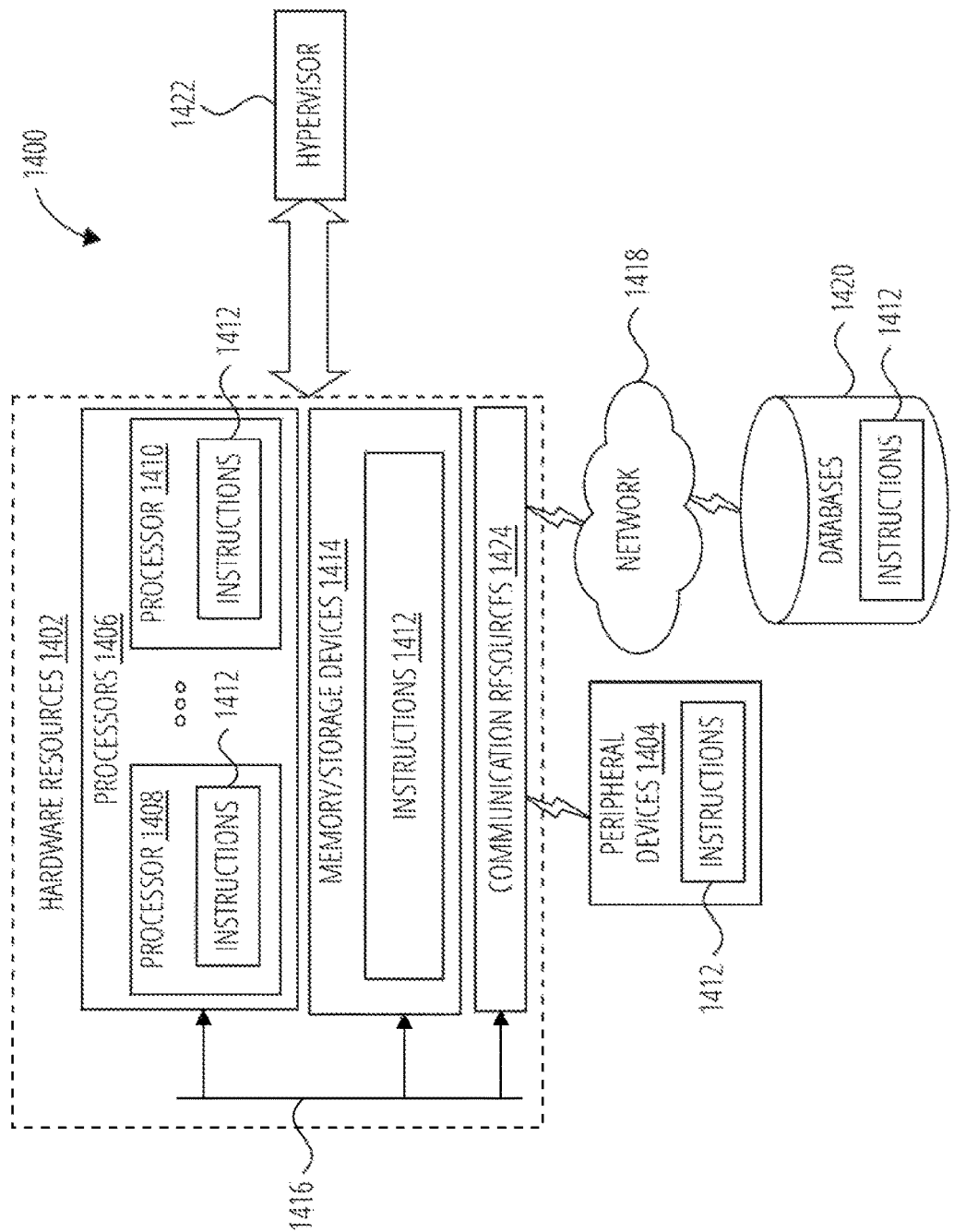
FIG. 14 illustrates components in accordance with one embodiment.

FIG. 14 is a block diagram illustrating components 1400, according to some example embodiments, able to read instructions from a machine-readable or computer-readable medium (e.g., a non-transitory machine-readable storage medium) and perform an one or more of the methodologies discussed herein. Specifically, FIG. 14 shows a diagrammatic representation of hardware resources 1402 including one or more processors 1406 (or processor cores), one or more memory/storage devices 1414, and one or more communication resources 1424, each of which may be communicatively coupled via a bus 1416. For embodiments where node virtualization (e.g., NFV) is utilized, a hypervisor 1422 may be executed to provide an execution environment for one or more network slices/sub-slices to utilize the hardware resources 1402.

The processors 1406 (e.g., a central processing unit (CPU), a reduced instruction set computing (RISC) processor, a complex instruction set computing (CISC) processor, a graphics processing Unit (GPU), a digital signal processor (DSP) such as a baseband processor, an application specific integrated circuit (ASIC), a radio-frequency integrated circuit (RFIC), another processor, or any suitable combination thereof) may include, for example, a processor 1401 and a processor 1410.

The memory/storage devices 1414 may include main memory, disk storage, or any suitable combination thereof. The memory/storage devices 1414 may include, but are not limited to any type of volatile or non-volatile memory such as dynamic random access memory (DRAM), static random-access memory (SRAM), erasable programmable read only memory (EPROM), electrically erasable programs able read-only memory (EEPROM) Flash memory, solid-state storage, etc.

The communication resources 1424 may include interconnection or network interface components or other suitable devices to communicate with One or more peripheral devices 1404 or one or more databases 1420 via u network 1418. For example, the communication resources 1424 may include wired communication components (e.g., for coupling via Universal Serial Bus (USB)), cellular communication components, NFC components, Bluetooth® components (e.g., Bluetooth® Low Energy), Wi-Fi® components, and other communication components.

Instructions 1412 may comprise software, a program, an application, an applet, an app, or other executable code for causing at least any of the processors 1406 to perform any one of more of the methodologies discussed herein. The instructions 1412 may reside, completely or partially, within at least one of the processors 1406 (e.g., within the processor's cache memory), the memory/storage devices 1414, or any suitable combination thereof. Furthermore, any portion of the instructions 1412 may be transferred to the hardware resources 1402 from any combination of the peripheral devices 1404 or the databases 1420. Accordingly, the memory of the processors 1406, the memory/storage devices 1414, the peripheral deices 1404, and the databases 1420 are examples of computer-readable and machine-readable media.

For one or more embodiments, at least one of the components set forth in one or more of the preceding figures may be configured to perform one or more operations, techniques, processes, and for methods as set forth in the Example Section below. For example, the baseband circuitry as described above in connection with one or more of the preceding figures may be configured to operate in accordance with one or more of the examples set forth below. For another example, circuity associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 may include a method for wireless communications by a user equipment (UE), comprising: decoding a radio resource control (RRC) message received from a base station, the RRC message comprising a configuration for dynamically reporting uplink (UL) transmit (Tx) direct current (DC) sub-carrier location information; determining a change associated with at least one previous UL Tx DC sub-carrier location has occurred thereby creating at least one new UL Tx DC sub-carrier location; and in response to determining the change, encoding a medium access control (MAC) control element (MAC CE) for transmission to the base station, the MAC CE including information corresponding to the at least one new UL Tx DC sub-carrier location.

Example 2 may include the method of example 1, wherein the at least one previous UL Tx DC sub-carrier location is associated with a first bandwidth part (BWP) of a carrier and the at least one new UL Tx DC sub-carrier location is associated with a second, different BWP of the carrier.

Example 3 may include the method of example 1, wherein the information corresponding to the at least one new UL Tx DC sub-carrier location comprises UL Tx DC sub-carrier location information corresponding to each active carrier associated with the UE.

Example 4 may include the method of example 1, wherein the UE includes a bandwidth pan (BWP) configuration and the locomotion corresponding to the at least one new UL Tx DC sub-carrier location comprises information associated with each BW p each active carrier associated with the UE.

Example 5 may include the method of example 4, wherein additional information associated with at least one of the BWPs of each active carrier associated with the UE included in the MAC CE, the additional information including at least information associated with frequency shifts corresponding to the at least one BWP.

Example 6 may include the method of example 1, wherein the information corresponding to the at least one new UL Tx DC sub-carrier location comprises information corresponding only to an active BWP of each active carrier.

Example 7 may include the method of example 1, wherein transmission of the encoded MAC CE is delayed by a timer.

Example 8 may include the method of example 1, wherein the MAC CE is encoded for transmission to both a master cell group (MCG) and a secondary cell group (SCG) associated with the UE.

Example 9 ma y include the method of example 8, wherein the in corresponding to the at least one new UL Tx DC sub-carrier location comprises UL Tx DC sub-carrier location information corresponding to at least one active carrier associated with the MCG and at least one active carrier associated with the SCG.

Example 10 may include the method of example 8, wherein the encoded MAC CE is transmitted to the MCG and a primary cell (PCell) of the MCG transmits the encoded MAC CE to the SCG.

Example 11 may include the method of example 10, wherein the information corresponding to the at least one new UL Tx DC sub-carrier location also comprises UL Tx DC sub-carrier location information corresponding to a UL BWP of a serving cell of the MCG or the SCG.

Example 12 may include the method of example 1, wherein the information corresponding to the at least one new UL Tx DC sub-carrier location comprises UL Tx DC sub-carrier location information corresponding to a supplemental UL (SUL) BWP of a serving cell of the MCG or the SCG.

Example 13 may include the method of example 1, wherein the information corresponding to the at least one new UL Tx DC sub-carrier location is limited to UL Tx DC sub-carrier location information that has changed since the at least one previous UL Tx DC sub-carrier location.

Example 14 may include a method for wireless communications by a user equipment (UE), comprising: decoding a radio resource control (RRC) message received from a base station, the RRC message comprising a configuration for dynamically reporting uplink (UL) transmit (Tx) direct current (DC) sub-carrier location information, in response to decoding the RRC message, encoding a message for transmission to the base station via RRC signaling, the message including each combination of Tx DC sob-carrier locations that are possible with configured bandwidth parts (BWPs) of configured carriers associated with the UE; determining a change associated with at least one previous UL Tx DC sub-carrier location has occurred thereby creating at least one new UL Tx DC sub-carrier location; and in response to determining the change, encoding a medium access control (MAC) control element (MAC CE) for transmission to the base station, the MAC CE including information corresponding to the at least one new UL Tx DC sub carrier location.

Example 15 may include the method of example 14, wherein the encoded message comprises a list of Tx DC sub-carrier locations for each configured BWP of each configured serving cell associated with the UE.

Example 16 may include the method of example 14, wherein the information corresponding to the at least one new UL Tx DC sub-carrier location within the MAC CE comprises an index associated with an entry within the encoded message.

Example 17 may include a method for wireless communications by a user equipment (EU), comprising: decoding a radio resource control (RRC) message received from a base station, the RRC message comprising a configuration for dynamically reporting uplink (UL) transmit (Tx) direct current (DC) sub-carrier location information; determining a change associated with at least one previous UL Tx DC sub-carrier location has occurred thereby creating at least one new UL Tx DC sub-carrier location; and in response to determining the change, encoding a message for transmission to the base station via RRC signaling, the message including information corresponding to the at least one new UL Tx DC sub-carrier location.

Example 18 may include the method of example 17, wherein the encoded message utilizes UE assistance information (UAI) RRC messaging.

Example 19 may include the method of example 17, wherein the information corresponding to the at least one new UL Tx DC sub-carrier location includes a snapshot of all Tx DC sub-carrier location information associated with each configured bandwidth part (BWP) of each configured carrier associated with the UE.

Example 20 may include the method of example 17, wherein the information corresponding to the at least one new UL Tx DC sub-carrier location is limited to UL Tx DC sub-carrier location of that has changed since the at least one previous UL Tx DC sub-carrier location.

Example 21 may include an apparatus comprising means to perform one or more elements of a method described in or related to any of the above Examples, or any other method or process described herein.

Example 22 may include one or more non-transitory computer-readable media comprising instructions to cause an electronic device, upon execution of the instructions by one or more processors t electronic device to perform one or more elements of a method described in or related to any of the above Examples, or any other method or process described herein.

Example 23 may include an apparatus comprising logic, modules, or circuitry to perform one or more elements of a method described in or related to any of the above Examples, oi any other method or process described herein.

Example 24 may include a method, technique, or process as described in of related to any the above Examples, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 26 may include a signal as described in or related to any of the above Examples, or portions or parts thereof.

Example 27 may include a datagram, packet, frame, segment, protocol data unit (PDU), or message as described in or related to any of the above Examples, or portions or parts thereof, or otherwise described in the present disclosure.

Example 28 may include a signal encoded with data as described in or related to any of the above Examples, or portions or parts thereof, or otherwise described in the present disclosure.

Example 29 may include a signal encoded with a datagram, packet, frame, segment, PDU, or message as described in or related to any of the above Examples, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 31 may include a computer program comprising instructions, wherein execution of the program by a processing element is to cause the processing element to carry out the method, techniques, or process as described in or related to any of the above Examples, or portions thereof.

Example 32 may include a signal in a wireless network as shown and described herein.

Example 33 may include a method of communication in a wireless network as shown and described herein.

Example 34 may include a system for providing wireless communication as shown and described herein.

Example 35 may include a device for providing wifeless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for wireless communications by a user equipment (UE), comprising:
    decoding a radio resource control (RRC) message received from a base station, the RRC message comprising a configuration for dynamically reporting uplink (UL) transmit (Tx) direct current (DC) sub-carrier location information;
    determining a change associated with at least one previous Tx DC sub-carrier location has occurred thereby creating at least one new UL Tx DC sub-carrier location; and
    in response to determining the change, encoding a medium access control (MAC) control element (MAC CE) for transmission to the base station, the MAC CE including information corresponding to the at least one new UL Tx DC sub-carrier location.

2. The method of claim 1, wherein the at least one previous UL Tx DC sub-carrier location is associated with a first bandwidth part (BWP) of a carrier and the in least one new UL Tx DC sub-carrier location is associated with a second, different BWP of the carrier.

3. The method of claim 1, wherein the information corresponding to the at least ono new UL Tx DC sub-carrier location comprises UL Tx DC sub-carrier location information corresponding to each active carrier associated with the UE.

4. The method of claim 1, wherein the UE includes a bandwidth part (BWP) configuration and the information corresponding to the at least one new UL Tx DC sub-carrier location comprises information associated with each BWP of each active carrier associated with the UE.

5. The method of claim 4, wherein additional information associated with at least one of the BWPs of each active carrier associated with the UE is included in the MAC CE, the additional information including at least information associated with frequency shifts corresponding to the at least one BWP.

6. The method of claim 1, wherein the information corresponding to the at least one new UL Tx DC sub-carrier location comprises information corresponding only to an active BWP of each active carrier.

7. The method of claim 1, wherein transmission of the encoded MAC CE is delayed by a timer.

8. The method of claim 1, wherein the MAC CE is encoded for transmission to both a master cell group (MCG) and a secondary cell group (SCG) associated with the UE.

9. The method of claim 8, wherein the information corresponding to the at least one new UL Tx DC sub-carrier location comprises UL Tx DC sub-carrier location information corresponding to at least one active carrier associated with the MCG and at least one active carrier associated with the SCG.

10. The method of claim 8, wherein the encoded MAC CE is transmitted to the MCG and a primary cell (PCell) of the MCG transmits the encoded MAC CE to the SCG.

11. The method of claim 10, wherein the information corresponding to the at least one new UL Tx DC sub-carrier location also comprises UL Tx DC sub-carrier location information corresponding to a UL BWP of a serving cell of the MCG or the SCG.

12. The method of claim 8, wherein the information corresponding to the at least one new UL Tx DC sub-carrier location comprises UL Tx DC sub-carrier location information corresponding to a supplemental UL (SUL) BWP of a serving cell of the MCG or the SCG.

13. The method of claim 1, wherein the information corresponding to the at least one new UL Tx DC sub-carrier location is limited to UL Tx DC sub-carrier location information that has changed since the at least one previous UL Tx DC sub-carrier location.

14. A method for wireless communications by a user equipment (UE), comprising:
    decoding a radio resource control (RRC) message received from a base station, the RRC message comprising a configuration for dynamically reporting uplink (UL) transmit (Tx) direct current (DC) sub-carrier location information;
    in response to decoding the RRC message, encoding a message for transmission to the base station via RRC signaling, the message including each combination of Tx DC sub-carrier locations that are possible with configured bandwidth parts (BWPs) of configured carriers associated with the UE;
    determining a change associated with at least one previous UL Tx DC sub-carrier location has occurred thereby creating at least one new UL Tx DC sub-carrier location; and
    in response to determining the change, encoding a medium access control (MAC) control element (MAC CE) for transmission to the base station, the MAC CE including information corresponding to the at least one new UL Tx DC sub-carrier location.

15. The method of claim 14, wherein the encoded message comprises a list of Tx DC sub-carrier locations for each configured BWP of each configured serving cell associated with the UE.

16. The method of claim 14, wherein the information corresponding to the at least one new UL Tx DC sub-carrier location within the MAC CE comprises an index associated with an entry within the encoded message.

17. A method for wireless communications by a user equipment (UE), comprising:
    decoding a radio resource control (RRC) message received from a base station, the RRC message comprising a configuration for dynamically reporting uplink (UL) transmit (Tx) direct current (DC) sub-carrier location information;

determining a change associated with at least one previous UL Tx DC sub-carrier location has occurred thereby creating at least one new UL Tx DC sub-carrier location; and in response to determining the change, encoding a message for transmission to the base station via RRC signaling, the message including information corresponding to the at least one new UL Tx DC sub-carrier location.

18. The method of claim 17, wherein the encoded message UE assistance information (UAI) RRC messaging.

19. The method of claim 17, wherein the information corresponding to the at least one new UL Tx DC sub-carrier location includes a snapshot of all Tx DC sub-carrier location information associated with each configured bandwidth part (BWP) of each configured carrier associated with the UE.

20. The method of claim 17, wherein the information corresponding to the at least one new UL Tx DC sub-carrier location is limited to UL Tx DC sub-carrier location information that has changed since the at least one previous UL Tx DC sub carrier location.

* * * * *